US007420552B2

(12) United States Patent
Kushima et al.

(10) Patent No.: US 7,420,552 B2
(45) Date of Patent: Sep. 2, 2008

(54) DRIVING VOLTAGE CONTROL DEVICE

(75) Inventors: Takahito Kushima, Takatsuki (JP); Tomokazu Kojima, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 566 days.

(21) Appl. No.: 11/076,898

(22) Filed: Mar. 11, 2005

(65) Prior Publication Data

US 2005/0206642 A1 Sep. 22, 2005

(30) Foreign Application Priority Data

Mar. 16, 2004 (JP) ............................ 2004-074284

(51) Int. Cl.
*G06F 3/038* (2006.01)
*G09G 5/00* (2006.01)

(52) U.S. Cl. ........................ 345/211; 345/204; 345/212

(58) Field of Classification Search ........... 345/55-100, 345/204-214
See application file for complete search history.

(56) References Cited

U.S. PATENT DOCUMENTS 5,455,534 A 10/1995 Motegi et al.
6,304,241 B1 * 10/2001 Udo et al. ..................... 345/96
6,762,565 B2 * 7/2004 Kudo et al. ................. 345/100
6,781,605 B2 * 8/2004 Kudo et al. ................. 345/690
6,784,866 B2 * 8/2004 Udo et al. ................... 345/100
2003/0043129 A1 3/2003 Tazuke
2003/0151581 A1 8/2003 Suyama et al.

FOREIGN PATENT DOCUMENTS

JP 2003-216256 7/2003

* cited by examiner

*Primary Examiner*—David L Lewis
(74) *Attorney, Agent, or Firm*—McDermott Will & Emery LLP

(57) ABSTRACT

A driving voltage control device includes: a first differential amplifier circuit for receiving a first input voltage and outputting a first output voltage; a second differential amplifier circuit for receiving a second input voltage and outputting a second output voltage; a control section for selecting one of a first mode and a second mode; and an output section for supplying the first output voltage output from the first differential amplifier circuit to an output node when the first mode is selected by the control section and supplying the second output voltage output from the second differential amplifier circuit to the output node when the second mode is selected by the control section. When the first mode is selected, the control section increases a driving power of the first differential amplifier circuit.

19 Claims, 19 Drawing Sheets

DRIVING VOLTAGE CONTROL DEVICE

CROSS REFERENCE TO RELATED APPLICATION

This application claims priority under 35 U.S.C. §119 on Patent Application No. 2004-74284 filed in Japan on Mar. 16, 2004, the entire contents of which are hereby incorporated by reference. The entire contents of Patent Application No. 2005-56026 filed in Japan on Mar. 1, 2005 are also incorporated by reference.

BACKGROUND OF THE INVENTION

1. Field of the Invention

The present invention relates to a device for controlling a driving voltage for driving a load such as a liquid crystal display panel by an AC driving method, and more particularly to a device capable of quickly increasing/decreasing a voltage value of a driving voltage.

2. Description of the Background Art

In order to drive a liquid crystal display panel of a portable device (e.g., a mobile telephone) by an AC driving method (e.g., line inversion driving method), a conventional liquid crystal display driving device includes a driving voltage control device for controlling a driving voltage supplied to the counter electrode of the liquid crystal display panel. The driving voltage control device inverts the polarity of the driving voltage according to a predetermined timing.

FIG. 16 shows a general configuration of a conventional driving voltage control device 9. The device 9 includes a timing control section 91, a VCOM voltage generation section 92, a VCOMH operational amplifier 93H, a VCOML operational amplifier 93L, smoothing capacitors C94H and C94L, switches SW1 and SW2 and an output terminal 95. The device 9 alternately outputs driving voltages VCOMH and VCOML to the counter electrode (not shown) of the liquid crystal display panel.

The timing control section 91 outputs the control signals Sa and Sb. The control signal Sa indicates the voltage value of the driving voltage VCOMH to be generated by the VCOM voltage generation section 92. The control signal Sb indicates the voltage value of the driving voltage VCOML to be generated by the VCOM voltage generation section 92. The timing control section 91 receives a timing signal TIMING, and outputs control signals S1 and S2. The timing signal TIMING indicates the timing, according to which the voltage levels of the control signals S1 and S2 are switched from "H level" to "L level" (or from "L level" to "H level").

The VCOM voltage generation section 92 is configured so as to generate the driving voltages VCOMH and VCOML according to the control signals Sa and Sb output from the timing control section 91. The VCOM voltage generation section 92 may be, for example, an RDAC (Resistance Digital Analog Converter), and has a configuration as shown in FIG. 2.

The switch SW1 is connected between a node N94H and the output terminal 95. The switch SW2 is connected between a node N94L and the output terminal 95. The switches SW1 and SW2 are on when the control signals S1 and S2, respectively, from the timing control section 91 are at "H level", and off when they are at "L level".

FIG. 16 shows a panel load C(LC) as the load capacitor of the liquid crystal display panel.

Internal Configuration of VCOMH Operational Amplifier 93H

FIG. 17 shows an internal configuration of the VCOMH operational amplifier 93H shown in FIG. 16. The VCOMH operational amplifier 93H includes input transistors TA1-H to TA5-H, output transistors TB1-H and TB2-H and a phase compensation capacitor CB-H. The input transistors TA1-H to TA5-H together form a differential stage 93AH of the VCOMH operational amplifier 93H. The output transistors TB1-H and TB2-H and the phase compensation capacitor CB-H together form an output stage 93BH of the VCOMH operational amplifier 93H.

Internal Configuration of VCOML Operational Amplifier 93L

FIG. 18 shows an internal configuration of the VCOML operational amplifier 93L shown in FIG. 16. The VCOML operational amplifier 93L includes input transistors TA1-L to TA5-L, output transistors TB1-L and TB2-L and a phase compensation capacitor CB-L. The input transistors TA1-L to TA5-L together form a differential stage 93AL of the VCOML operational amplifier 93L. The output transistors TB1-L and TB2-L and the phase compensation capacitor CB-L together form an output stage 93BL of the VCOML operational amplifier 93L.

Operation

Next, an operation of the driving voltage control device 9 shown in FIG. 16 will be described with reference to FIG. 19. In the illustrated example, the voltage value of the driving voltage VCOMH is "+3 V" and the voltage value of the driving voltage VCOML is "−3 V".

In the period t0-t1, the timing control section 91 keeps the control signal S1 at "L level" and the control signal S2 at "H level". A voltage V95 at the output terminal 95 is "−3 V".

At time t1, the timing control section 91 brings the control signal S1 to "H level" and the control signal S2 to "L level" according to the timing signal TIMING. Thus, the switch SW1 is turned on, and the output terminal 95 is connected to the VCOMH operational amplifier 93H. Since the potential V95 at the output terminal 95 (the potential of the panel load C(LC)) is "−3 V", a current flows from a VCOMH operational amplifier 13H to the output terminal 95 (the panel load C(LC)) until the potential V95 at the output terminal 95 reaches "+3 V" (until the rising time tpH elapses).

At time t3, the timing control section 91 brings the control signal S1 to "L level" and the control signal S2 to "H level" according to the timing signal TIMING from an external component. Thus, the switch SW2 is turned on, and the output terminal 95 is connected to the VCOML operational amplifier 93L. Since a potential V95 at the output terminal 95 is "+3 V", a current flows from the output terminal 95 to a VCOML operational amplifier 93L until the potential V95 at the output terminal 95 reaches "−3 V" (until the falling time tpL elapses).

In the period t4-t9, an operation similar to that in the period t0-t4 is performed.

Thus, when inverting the polarity of the driving voltage, the panel load C(LC) needs to be charged/discharged, whereby the potential V95 at the output terminal 95 slowly increases (or decreases).

Moreover, with the recent increase in the resolution of a liquid crystal display panel, the capacitance value of the panel load C(LC) is increasing. Furthermore, with an increasing demand for a mobile telephone capable of displaying a motion picture, the panel load C(LC) needs to be charged/discharged more quickly. In order to quickly charge/discharge the panel load C(LC) having a large capacitance value (i.e., to shorten the rising time tpH and the falling time tpL), it is necessary to apply a high voltage to an operational amplifier included in the driving voltage control device. In view of this, a transistor with a high breakdown voltage is used as the VCOMH operational amplifier 93H and the VCOML operational amplifier 93L shown in FIG. 16.

Driving voltage control devices in which the bias current of an operational amplifier is controlled so as to reduce the power consumption while the circuit area is reduced so as to prevent an increase in cost are known in the art (see, for example, Japanese Laid-Open Patent Publication No. 2003-216256).

SUMMARY OF THE INVENTION

However, the operational amplifiers 93H and 93L using transistors with a high breakdown voltage have a large circuit area and a very high power consumption. Therefore, where a liquid crystal display panel of a portable device such as a mobile telephone is driven by a liquid crystal display driver using the driving voltage control device 9 shown in FIG. 16, for example, since the liquid crystal display driver consumes a very large amount of power, the length of time for which the portable device can be used after being fully charged will be very short.

According to one aspect of the present invention, a driving voltage control device includes: a first differential amplifier circuit for receiving a first input voltage and outputting a first output voltage; a second differential amplifier circuit for receiving a second input voltage and outputting a second output voltage; a control section for selecting one of a first mode and a second mode; and an output section for supplying the first output voltage output from the first differential amplifier circuit to an output node when the first mode is selected by the control section and supplying the second output voltage output from the second differential amplifier circuit to the output node when the second mode is selected by the control section. When the first mode is selected, the control section increases a driving power of the first differential amplifier circuit.

In this driving voltage control device, when the first output voltage is supplied (when the operation is in the first mode), the driving power of the first differential amplifier circuit is increased (the amount of current output from the first differential amplifier circuit (or the amount of current input to the first differential amplifier circuit) is increased). Thus, the output node can be quickly charged/discharged. When the second output voltage is supplied (when the operation is not in the first mode), the driving power of the first differential amplifier circuit is not increased. Therefore, no excessive current flows when the output node does not need to be charged/discharged, whereby the power consumption can be reduced.

Preferably, a period of time for which the driving power of the first differential amplifier circuit is increased is shorter than a period of time for which the control section continuously selects the first mode.

With this driving voltage control device, it is possible to further reduce the power consumption. Moreover, the output node can be charged/discharged more quickly than in the prior art, even if the period of time for which the driving power of the first differential amplifier circuit is increased is shorter than the period of time taken for the voltage value of the voltage at the output node to reach the voltage value of the first output voltage.

Preferably, when the first mode is selected, the control section increases the driving power of the first differential amplifier circuit according to a voltage value of a voltage at the output node.

With this driving voltage control device, it is possible to determine whether or not the voltage at the output node has reached a predetermined voltage value by referring to the voltage value of the voltage at the output node. For example, the control section can determine whether or not the voltage at the output node has reached the voltage value of the first output voltage. Thus, it is possible to shorten the period of time for which the driving power of the first differential amplifier circuit is increased, thereby further reducing the power consumption.

Preferably, when the first mode is selected, the control section increases the driving power of the first differential amplifier circuit until the voltage at the output node reaches a first voltage value.

With this driving voltage control device, it is possible to further reduce the power consumption. The output node can be charged/discharged more quickly than in the prior art, even if the absolute value of the first voltage value is smaller than the absolute value of the voltage value of the first output voltage.

Preferably, the control section includes: a mode selector section for selecting one of the first and second modes; a comparator section for comparing the voltage at the output node with a first comparative voltage having the first voltage value; and a driving power adjustment section for increasing the driving power of the first differential amplifier circuit according to the mode selected by the mode selector section and a comparison result from the comparator section.

With this driving voltage control device, the driving power adjustment section can determine whether the first or second output voltage is supplied from the output section by referring to the mode being selected by the mode selector section. Moreover, the driving power adjustment section can determine whether or not the voltage at the output node has reached the first voltage value by referring to the comparison result from the comparator section. Thus, it is possible to shorten the period of time for which the driving power of the first differential amplifier circuit is increased, thereby further reducing the power consumption.

Preferably, the control section increases a driving power of the first differential amplifier circuit when the first mode is selected, and increases a driving power of the second differential amplifier circuit when the second mode is selected.

With this driving voltage control device, the driving power of one differential amplifier circuit (the differential amplifier circuit required to supply the output voltage to the output section) is increased, and the driving power of the other differential amplifier circuit (the differential amplifier circuit not required to supply the output voltage to the output section) is not increased. Thus, the output node can be charged/discharged quickly and the power consumption can be reduced.

Preferably, the control section includes: a mode selector section for selecting one of the first and second modes; a voltage selector section for selecting one of a first comparative voltage having the first voltage value and a second comparative voltage having the second voltage value according to the mode selected by the mode selector section; a comparator section for comparing the voltage at the output node with the voltage selected by the voltage selector section; and a driving power adjustment section for increasing the driving power of the first or second differential amplifier circuit according to the mode selected by the mode selector section and a comparison result from the comparator section.

With this driving voltage control device, the comparator section can determine whether or not the voltage value of the voltage at the output node has reached a voltage value suitable for the mode being selected.

Preferably, the first differential amplifier circuit includes: a first differential stage; first and second output transistors connected in series with each other between a first reference node receiving a first reference voltage and a second reference node receiving a second reference voltage; and a first adjustment transistor. The first output transistor is connected between the first reference node and the second output transistor, and receives at a gate thereof an output of the first differential stage. The second output transistor is connected between the first output transistor and the second reference node, and receives at a gate thereof a voltage applied to a first voltage supply node. The first differential stage outputs a voltage having a voltage value according to a difference between a voltage at a first interconnection node and the first input voltage, the first interconnection node being present between the first output transistor and the second output transistor. When the first mode is selected, the control section sets a connection state of the first adjustment transistor to a first connection state. In the first connection state, the first adjustment transistor is connected between the first reference node and the first interconnection node, and receives at a gate thereof the output of the first differential stage.

In this driving voltage control device, the voltage occurring at the first interconnection node is output as the first output voltage. When the operation is in the first mode, a current flows not only between the first output transistor and the first interconnection node, but also between the first adjustment transistor and the first interconnection node. Therefore, the current flowing between the first reference node and the first interconnection node increases. Thus, the output node can be quickly charged/discharged. When the operation is not in the first mode, no current flows between the first reference node and the first interconnection node. Therefore, no excessive current flows when the output node does not need to be charged/discharged, whereby the power consumption can be reduced.

Preferably, the first differential amplifier circuit includes: a first differential stage; first and second output transistors connected in series with each other between a first reference node receiving a first reference voltage and a second reference node receiving a second reference voltage; and a first adjustment transistor. The first output transistor is connected between the first reference node and the second output transistor, and receives at a gate thereof an output of the first differential stage. The second output transistor is connected between the first output transistor and the second reference node, and receives at a gate thereof a voltage applied to a first voltage supply node. The first differential stage outputs a voltage having a voltage value according to a difference between a voltage at a first interconnection node and the first input voltage, the first interconnection node being present between the first output transistor and the second output transistor. When the first mode is selected, the control section sets a connection state of the first adjustment transistor to a first connection state. In the first connection state, the first adjustment transistor is connected between the first interconnection node and the second reference node, and receives at a gate thereof the voltage applied to the first voltage supply node.

In this driving voltage control device, the voltage occurring at the first interconnection node is output as the first output voltage. When the operation is in the first mode, a current flows not only between the second output transistor and the first interconnection node, but also between the first adjustment transistor and the first interconnection node. Therefore, the current flowing between the second reference node and the second interconnection node increases. Thus, the output node can be quickly charged/discharged. When the operation is not in the first mode, no current flows between the first adjustment transistor and the first interconnection node. Therefore, no excessive current flows when the output node does not need to be charged/discharged, whereby the power consumption can be reduced.

Preferably, the first differential amplifier circuit includes: first and second input transistors connected in series with each other between a first reference node receiving a first reference voltage and a second reference node receiving a second reference voltage; third and fourth input transistors connected in series with each other between the first reference node and the second reference node; a fifth input transistor connected between a first interconnection node and the second reference node, and receives at a gate thereof a voltage applied to a first voltage supply node, the first interconnection node being present between the second input transistor and the fourth input transistor; a first adjustment transistor; and a first output stage. The first input transistor is connected between the first reference node and the second input transistor, and a gate of the first input transistor is connected to a drain of the first input transistor. The second input transistor is connected between the first input transistor and the first interconnection node, and receives at a gate thereof an output of the first output stage. The third input transistor is connected between the first reference node and the fourth input transistor, and a gate of the third input transistor is connected to the gate of the first input transistor. The fourth input transistor is connected between the third input transistor and the first interconnection node, and receives at a gate thereof the first input voltage. The first output stage outputs the first output voltage having a voltage value according to a voltage at a second interconnection node between the third input transistor and the fourth input transistor. When the first mode is selected, the control section sets a connection state of the first adjustment transistor to a first connection state. In the first connection state, the first adjustment transistor is connected between the first interconnection node and the second reference node, and receives at a gate thereof the voltage applied to the first voltage supply node.

In this driving voltage control device, the output of the first output stage is output as the first voltage. When the operation is in the first mode, a current flows not only between the fifth input transistor and the second interconnection node, but also between the first adjustment transistor and the second interconnection node. Therefore, the current flowing between the second reference node and the second interconnection node increases, whereby the voltage received by the first output stage can be quickly increased/decreased. Thus, it is possible to shorten the amount of time required for charging/discharging the output node. When the operation is not in the first mode, no current flows between the first adjustment transistor and the second interconnection node. Therefore, no excessive current flows when the output node does not need to be charged/discharged, whereby the power consumption can be reduced.

Preferably, the first differential amplifier circuit further includes a second adjustment transistor. When the first mode is selected, the control section sets the connection state of the first adjustment transistor to the first connection state and sets a connection state of the second adjustment transistor to a second connection state. In the second connection state, the second adjustment transistor is connected between the first interconnection node and the second reference node, and receives at a gate thereof a voltage applied to the first voltage supply node.

With this driving voltage control device, not only the current flowing between the first interconnection node and the first reference node is increased, but also the current flowing between the first interconnection node and the second reference node is increased, whereby it is possible to suppress an oscillation. Moreover, by setting the second adjustment transistor according to the first adjustment transistor (e.g., setting the size ratio (relationship of W/L ratios of each transistors) between the first adjustment transistor and the second adjustment transistor to be the same as that between the first output transistor and the second output transistor), it is possible to reduce the offset voltage that the first differential amplifier circuit has.

As described above, when the first output voltage is supplied (when the operation is in the first mode), the driving power of the first differential amplifier circuit is increased (the amount of current output from the first differential amplifier circuit (or the amount of current input to the first differential amplifier circuit) is increased). Thus, the output node can be quickly charged/discharged. When the second output voltage is supplied (when the operation is not in the first mode), the driving power of the first differential amplifier circuit is not increased. Therefore, no excessive current flows when the output node does not need to be charged/discharged, whereby the power consumption can be reduced.

DESCRIPTION OF THE PREFERRED EMBODIMENTS

Figure 1:
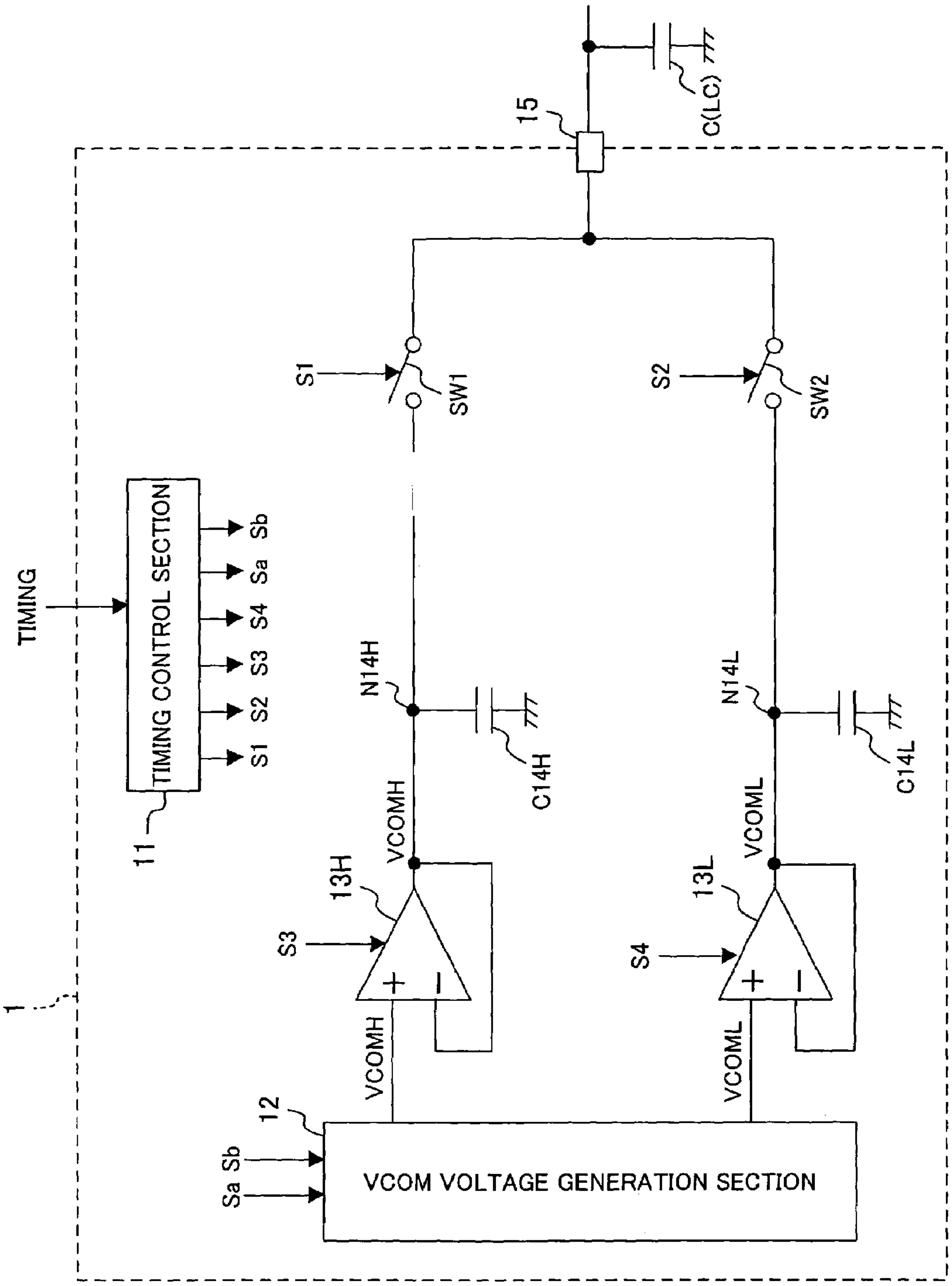
FIG. 1 shows a general configuration of a driving voltage control device 1 according to a first embodiment of the present invention.

Preferred embodiments of the present invention will now be described in detail with reference to the drawings. Like elements are denoted by like reference numerals throughout the various figures, and will not be described repeatedly.

First Embodiment

General Configuration

FIG. 1 shows a general configuration of a driving voltage control device 1 according to a first embodiment of the present invention. The device 1 includes a timing control section 11, a VCOM voltage generation section 12, the VCOMH operational amplifier 13H, the VCOML operational amplifier 13L, smoothing capacitors C14H and C14L, the switches SW1 and SW2 and the output terminal 15. The device 1 controls the driving voltages VCOMH and VCOML for driving a liquid crystal display panel by an AC driving method (e.g., line inversion driving method). For example, the driving voltage control device 1 alternately outputs the driving voltages VCOMH and VCOML according to a predetermined timing.

The timing control section 11 outputs the control signals Sa and Sb. The control signal Sa indicates the voltage value of the driving voltage VCOM to be generated by the VCOM voltage generation section 12. The control signal Sb indicates the voltage value of the driving voltage VCOML to be generated by the VCOM voltage generation section 12. The timing control section 11 receives a timing signal TIMING, and outputs the control signals S1 to S4. The timing signal TIMING indicates the timing according to which the driving voltage output from the output terminal 15 is switched from VCOMH to VCOML (or from VCOML to VCOMH). The timing control section 11 switches the voltage levels of the control signals S1 to S4 from “H level” to “L-level” (or from “L level” to “H level”).

The VCOM voltage generation section 12 generates the driving voltage VCOMH having a voltage value according to the control signal Sa output from the timing control section 11. The VCOM voltage generation section 12 generates the driving voltage VCOML having a voltage value according to the control signal Sb output from the timing control section 11.

The VCOMH operational amplifier 131 forms a voltage follower circuit, and outputs the driving voltage VCOMH generated by the VCOM voltage generation section 12. The driving power (the amount of current input/output per unit time) of the VCOMH operational amplifier 13H is adjusted according to the control signal S3 output from the timing control section 11.

The VCOML operational amplifier 13L forms a voltage follower circuit, and outputs the driving voltage VCOML generated by the VCOM voltage generation section 12. The driving power (the amount of current input/output per unit time) of the VCOML operational amplifier 13L is adjusted according to the control signal S4 output from the timing control section 11.

The smoothing capacitor C14H is provided for the purpose of smoothing the fluctuation in the output of the VCOMH operational amplifier 13H, and is connected between a node N14H (a node between the VCOMH operational amplifier 13H and the output terminal 15) and a ground node. The smoothing capacitor C14L is provided for the purpose of smoothing the fluctuation in the output of the VCOML operational amplifier 13L, and is connected between a node N14L (a node between the VCOML operational amplifier 13L and the output terminal 15) and a ground node.

The switch SW1 is connected between the node N14H and the output terminal 15. The switch SW2 is connected between the node N14L and the output terminal 15. The switches SW1 and SW2 are on when the control signals S1 and S2, respectively, from the timing control section 11 are at "H level", and off when they are at "L level".

The output terminal 15 supplies the potential at the node N14H (the driving voltage VCOMH) or the potential at the node N14L (the driving voltage VCOML) to the counter electrode (not shown) of the liquid crystal display panel.

FIG. 1 shows the panel load C(LC) as the load capacitor of the liquid crystal display panel.

Internal Configuration of VCOM Voltage Generation Section 12

Figure 2:
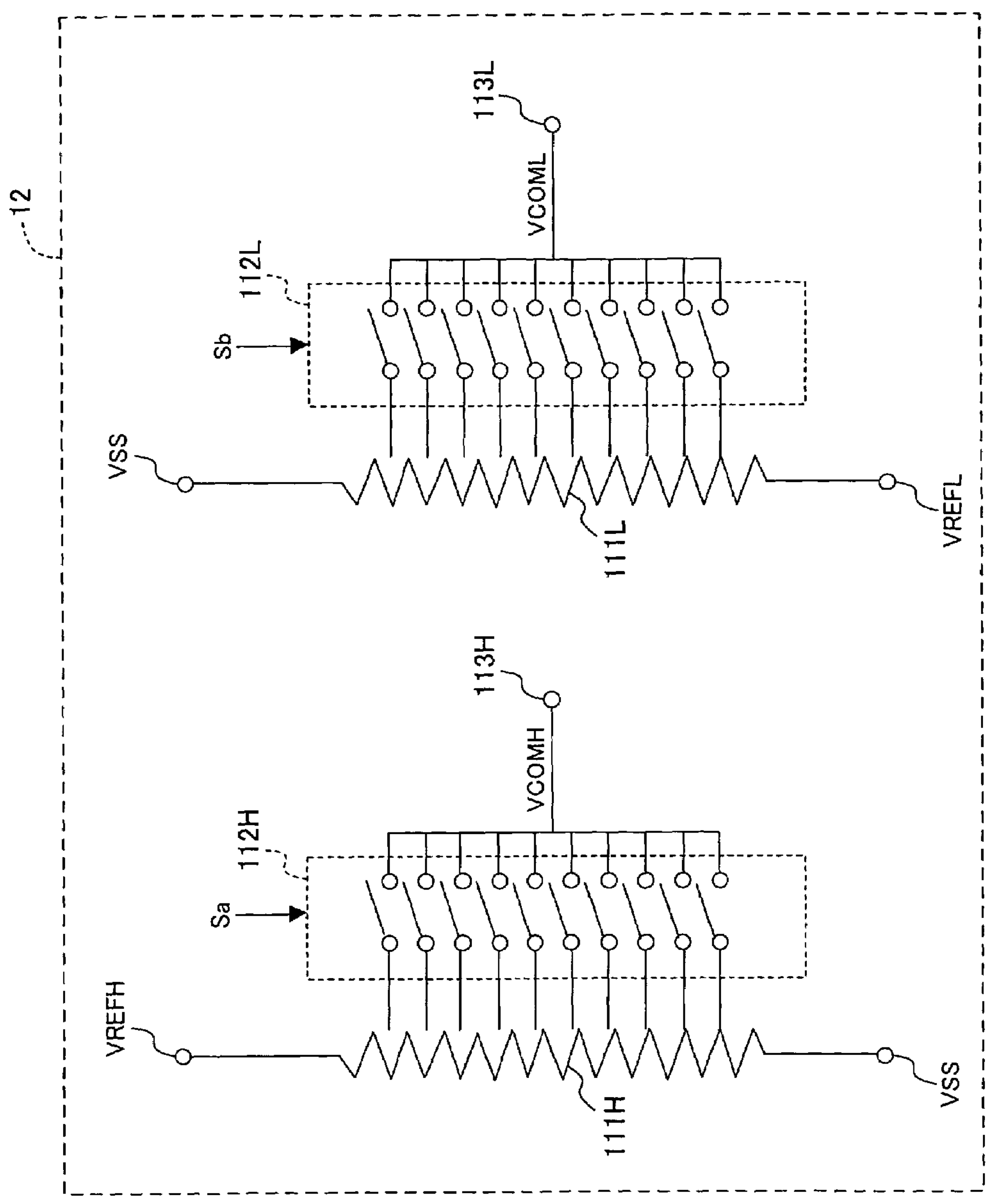
FIG. 2 shows an internal configuration of a VCOM voltage generation section 12 shown in FIG. 1.

FIG. 2 shows an internal configuration of the VCOM voltage generation section 12 shown in FIG. 1. The VCOM voltage generation section 12 includes ladder resistors 111H and 111L, selector sections 112H and 112L and the output terminals 113H and 113L.

The ladder resistor 111H, the selector section 112H and the output terminal 113H together form a so-called "RDAC" (Resistance Digital Analog Converter). The ladder resistor 111H is connected between a reference node VREFH and a reference node VSS, and generates a plurality of divided voltages by dividing the voltage between the reference node VREFH and the reference node VSS. The selector section 112H selects one of the divided voltages generated by the ladder resistor 111H according to the control signal Sa output from the timing control section 11. The output terminal 113H outputs the divided voltage selected by the selector section 112H as the driving voltage VCOMH.

The ladder resistor 111L, the selector section 112L and the output terminal 113L together form a so-called "RDAC". The ladder resistor 111L is connected between the reference node VSS and a reference node VREFL, and generates a plurality of divided voltages by dividing the voltage between the reference node VSS and the reference node VREFL. The selector section 112L selects one of the divided voltages generated by the ladder resistor 111L according to the control signal Sb output from the timing control section 11. The output terminal 113L outputs the divided voltage selected by the selector section 112L as the driving voltage VCOML.

Internal Configuration of VCOMH Operational Amplifier 13H

Figure 3:
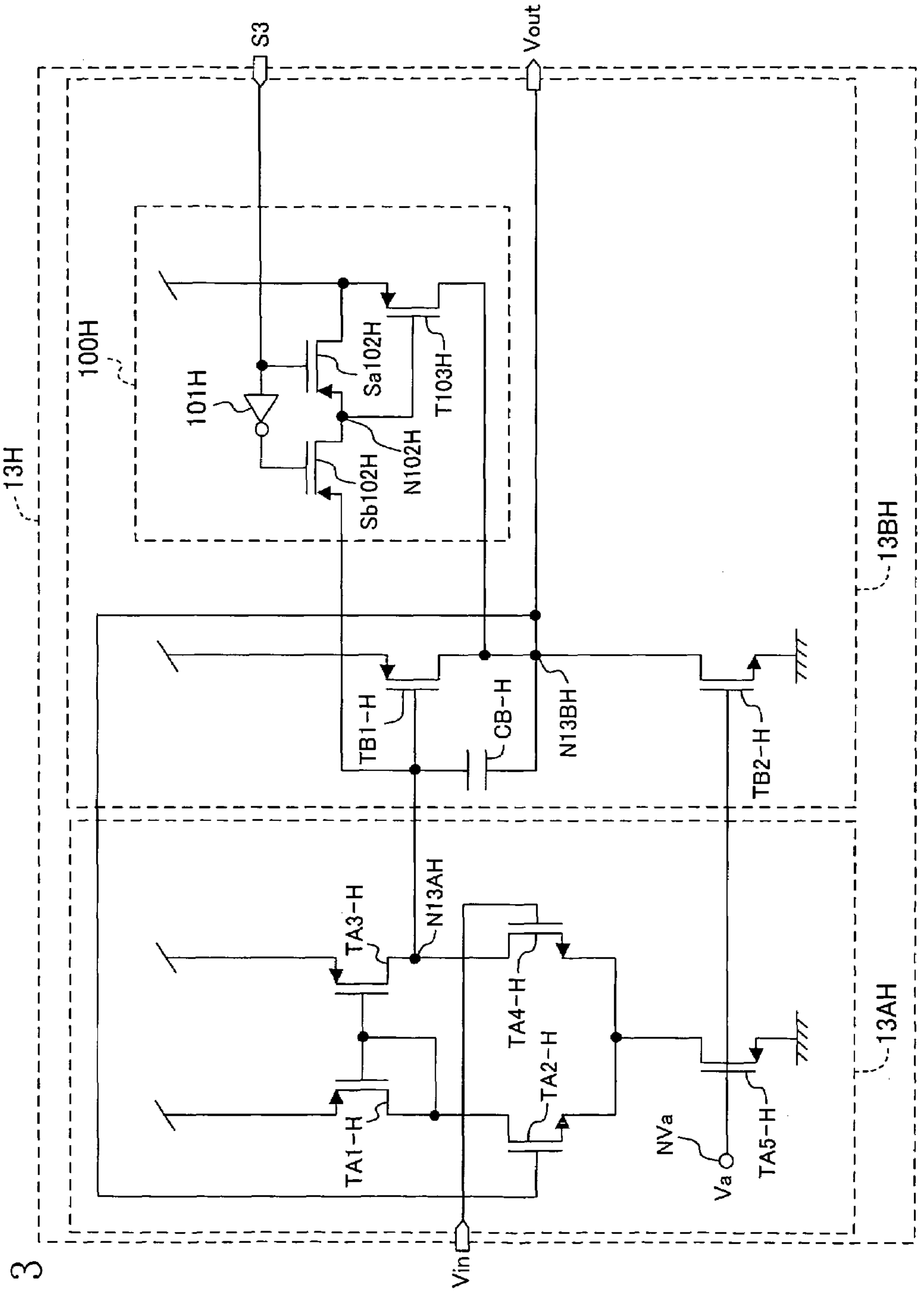
FIG. 3 shows an internal configuration of the VCOMH operational amplifier 13H shown in FIG. 1.

FIG. 3 shows an internal configuration of the VCOMH operational amplifier 13H shown in FIG. 1. The VCOMH operational amplifier 13H includes the input transistors TA1-H, TA2-H, TA3-H, TA4-H and TA5-H, the output transistors TB1-H and TB2-H, the phase compensation capacitor CB-H and a driving power adjustment section 100H.

Differential Stage 13AH

The input transistors TA1-H to TA5-H together form a differential stage 13AH of the VCOMH operational amplifier 13H.

The input transistor TA5-H is connected between a power supply node and a ground node, and receives at the gate thereof a bias voltage Va supplied to a bias voltage supply node NVa.

The input transistors TA1-H and TA2-H are connected in series with each other between a power supply node and the input transistor TA5-H. The input transistor TA1-H is connected between the power supply node and the input transistor TA2-H, with the gate and drain thereof being connected to each other. The input transistor TA2-H is connected between the input transistor TA1-H and the input transistor TA5-H.

The input transistors TA3-H and TA4-H are connected in series with each other between a power supply node and the input transistor TA5-H. The input transistor TA3-H is connected between the power supply node and the input transistor TA4-H, and the gate thereof is connected to the gate of the input transistor TA1-H. The input transistor TA4-H is connected between the input transistor TA3-H and the input transistor TA5-H.

Output Stage 13BH

The output transistors TB1-H and TB2-H and the phase compensation capacitor CB-H together form an output stage 13BH of the VCOMH operational amplifier 13H.

The output transistors TB1-H and TB2-H are connected in series with each other between a power supply node and a ground node. The output transistor TB1-H is connected between the power supply node and the output transistor TB2-H, and the gate thereof is connected to a node N13AH. The node N13AH is an interconnection node between the input transistor TA3-H and the input transistor TA4-H. The output transistor TB2-H is connected between the output transistor TB1-H and the ground node, and receives at the gate thereof the bias voltage Va supplied to the bias voltage supply node NVa. The phase compensation capacitor CB-H is connected between the gate of the output transistor TB1-H and a node N13BH. The node N13BH is an interconnection node between the output transistor TB1-H and the output transistor TB2-H.

The input transistor TA4-H receives at the gate thereof a voltage Vin (the driving voltage VCOMH) from an external component (the VCOM voltage generation section 12). The input transistor TA2-H receives at the gate thereof the voltage at the node N13BH.

Driving Power Adjustment Section 100H

The driving power adjustment section 100H includes an inverter 101H, switching transistors Sa102H and Sb102H and an adjustment transistor T103H.

The inverter 101H inverts the control signal S3 from an external component (the timing control section 11).

The switching transistors Sa102H and Sb102H are connected in series with each other between a power supply node and the node N13AH. The switching transistor Sa102H is connected between the power supply node and the switching transistor Sb102H, and receives at the gate thereof the control signal S3 from an external component (the timing control section 11). The switching transistor Sb102H is connected between the switching transistor Sa102H and the node N13AH, and receives at the gate thereof a signal output from the inverter 101H.

The adjustment transistor T103H is connected between the power supply node and the node N13BH, and the gate thereof is connected to a node N102H. The node N102H is an interconnection node between the switching transistor Sa102H and the switching transistor Sb102H.

The control signal S3 being at "L level" is a voltage that activates the switching transistors Sa102H and Sb102H (P-channel transistors), and the control signal S3 being at "H level" is a voltage that does not activate the switching transistors Sa102H and Sb102H (P-channel transistors).

Internal Configuration of VCOML Operational Amplifier 13L

Figure 4:
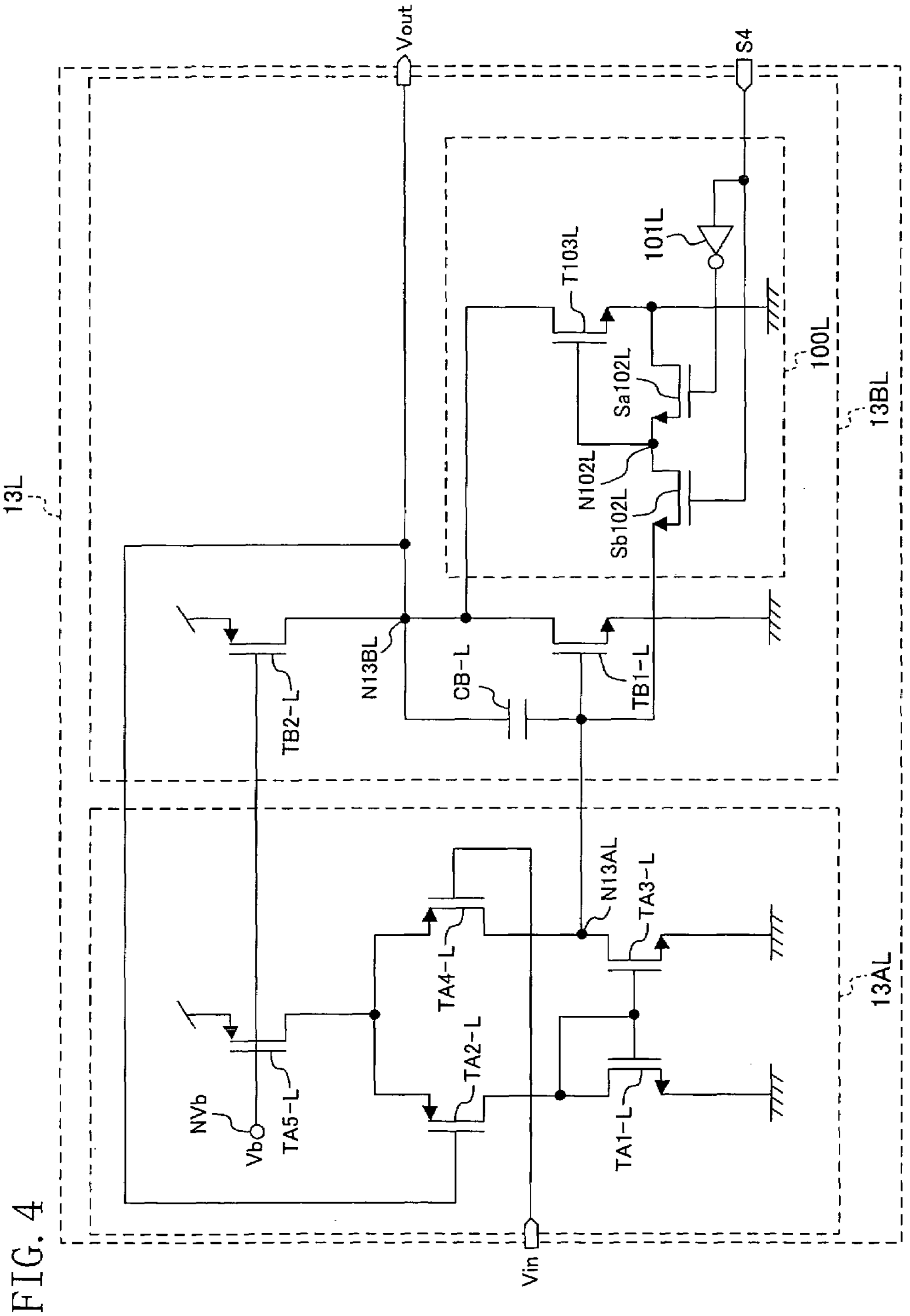
FIG. 4 shows an internal configuration of the VCOML operational amplifier 13L shown in FIG. 1.

FIG. 4 shows an internal configuration of the VCOML operational amplifier 13L shown in FIG. 1. The VCOML operational amplifier 13L includes the input transistors TA1-L, TA2-L, TA3-L, TA4-L and TA5-L, the output transistors TB1-L and TB2-L, the phase compensation capacitor CB-L and a driving power adjustment section 100L.

Differential Stage 13AL

The input transistors TA1-L to TA5-L together form a differential stage 13AL of the VCOML operational amplifier 13L.

The input transistor TA5-L is connected between a ground node and a power supply node, and receives at the gate thereof a bias voltage Vb supplied to a bias voltage supply node NVb.

The input transistors TA1-L and TA2-L are connected in series with each other between a ground node and the input transistor TA5-L. The input transistor TA1-L is connected between the ground node and the input transistor TA2-L, with the gate and drain thereof being connected to each other. The input transistor TA2-L is connected between the input transistor TA1-L and the input transistor TA5-L.

The input transistors TA3-L and TA4-L are connected in series with each other between a ground node and the input transistor TA5-L. The input transistor TA3-L is connected between the ground node and the input transistor TA4-L, and the gate thereof is connected to the input transistor TA1-L. The input transistor TA4-L is connected between the input transistor TA3-L and the input transistor TA5-L.

Output Stage 13BL

The output transistors TB1-L and TB2-L and the phase compensation capacitor CB-L together form an output stage 13BL of the VCOML operational amplifier 13L.

The output transistors TB1-L and TB2-L are connected in series with each other between a ground node and a power supply node. The output transistor TB1-L is connected between the ground node and the output transistor TB2-L, and the gate thereof is connected to a node N13AL. The node N13AL is an interconnection node between the input transistor TA3-L and the input transistor TA4-L. The output transistor TB2-L is connected between the output transistor TB1-L and the power supply node, and receives at the gate thereof the bias voltage Vb supplied to the bias voltage supply node NVb. The phase compensation capacitor CB-L is connected between the gate of the output transistor TB1-L and a node N13BL. The node N13BL is an interconnection node between the output transistor TB1-L and the output transistor TB2-L.

The input transistor TA4-L receives at the gate thereof the voltage Vin (the driving voltage VCOML) from an external component (the VCOM voltage generation section 12). The input transistor TA2-L receives at the gate thereof the voltage at the node N13BL.

Driving Power Adjustment Section 100L

The driving power adjustment section 100L includes an inverter 101L, switching transistors Sa102L and Sb102L and an adjustment transistor T103L.

The inverter 101L inverts the control signal S4 from an external component (the timing control section 11).

The switching transistors Sa102L and Sb102L are connected in series with each other between a ground node and the node N13AL. The switching transistor Sa102L is connected between the ground node and the switching transistor Sb102L, and receives at the gate thereof a signal output from the inverter 101L. The switching transistor Sb102L is connected between the switching transistor Sa102L and the node N13AL, and receives at the gate thereof the control signal S4 from an external component (the timing control section 11).

The adjustment transistor T103L is connected between the ground node and the node N13BL, and the gate thereof is connected to a node N102L. The node N102L is an interconnection node between the switching transistor Sa102L and the switching transistor Sb102L.

The control signal S4 being at "H level" is a voltage that activates the switching transistors Sa102L and Sb102L (N-channel transistors), and the control signal S4 being at "L level" is a voltage that does not activate the switching transistors Sa102L and Sb102L (N-channel transistors).

Operation of VCOMH Operational Amplifier 13H

Next, an operation of the VCOMH operational amplifier 13H shown in FIG. 3 will be described.

When the control signal S3 is at "L level", the switching transistor Sa102H is on. When the control signal S3 is at "L level", the inverter 101H outputs an inverted version of the control signal S3 ("H level"), whereby the switching transistor Sb102H is off. Therefore, the gate of the adjustment transistor T103H is connected to the power supply node, and thus the gate and the source of the adjustment transistor T103H will be at the same potential, whereby no current flows through the adjustment transistor T103H.

When the control signal S3 is at "H level", the switching transistor Sa102H is off. When the control signal S3 is at "H level", the inverter 101H outputs an inverted version of the control signal S3 ("L level"), whereby the switching transistor Sb102H is on. Since the gate of the adjustment transistor T103H is connected to the node N13AH, a current flows from the adjustment transistor T103H to the node N13BH. For example, assume that a drain current whose current value is twice as high as that of a drain current that flows through the output transistor TB1-H when the same gate voltage is applied to the adjustment transistor T103H and to the output transistor TB1-H flows through the adjustment transistor T103H. Then, as compared with a case where a drain current flows only through the output transistor TB1-H (i.e., where the control signal S3 is at "L level"), a drain current that is three times as high will flow from the power supply node to the node N13BH.

Thus, when the control signal S3 is at "H level", the current flowing from the power supply node to the node N13BH increases. In other words, the driving power of the output transistor-TB1-H increases.

Operation of VCOML Operational Amplifier 13L

Next, an operation of the VCOML operational amplifier 13L shown in FIG. 4 will be described.

When the control signal S4 is at "L level", the inverter 101L outputs an inverted version of the control signal S4 ("H level"), whereby the switching transistor Sa102L is on. Moreover, when the control signal S4 is at "L level", the switching transistor Sb102L is off Therefore, the gate of the adjustment transistor T103L is connected to the ground node, and thus the gate and the source of the adjustment transistor T103L will be at the same potential, whereby no current flows through the adjustment transistor T103L.

When the control signal S4 is at "H level", the inverter 101L outputs an inverted version of the control signal S4 ("L level"), whereby the switching transistor Sa102L is off. Moreover, when the control signal S4 is at "H level", the switching transistor Sb102L is on. Therefore, the gate of the adjustment transistor T103L is connected to the node N13AL, whereby a current flows from the node N13BL to the adjustment transistor T103L.

Thus, when the control signal S4 is at "H level", the current flowing from the node N13BL to the ground node increases. In other words, the driving power of the output transistor TB1-L increases.

Operation of Driving Voltage Control Device 1

Figure 5:
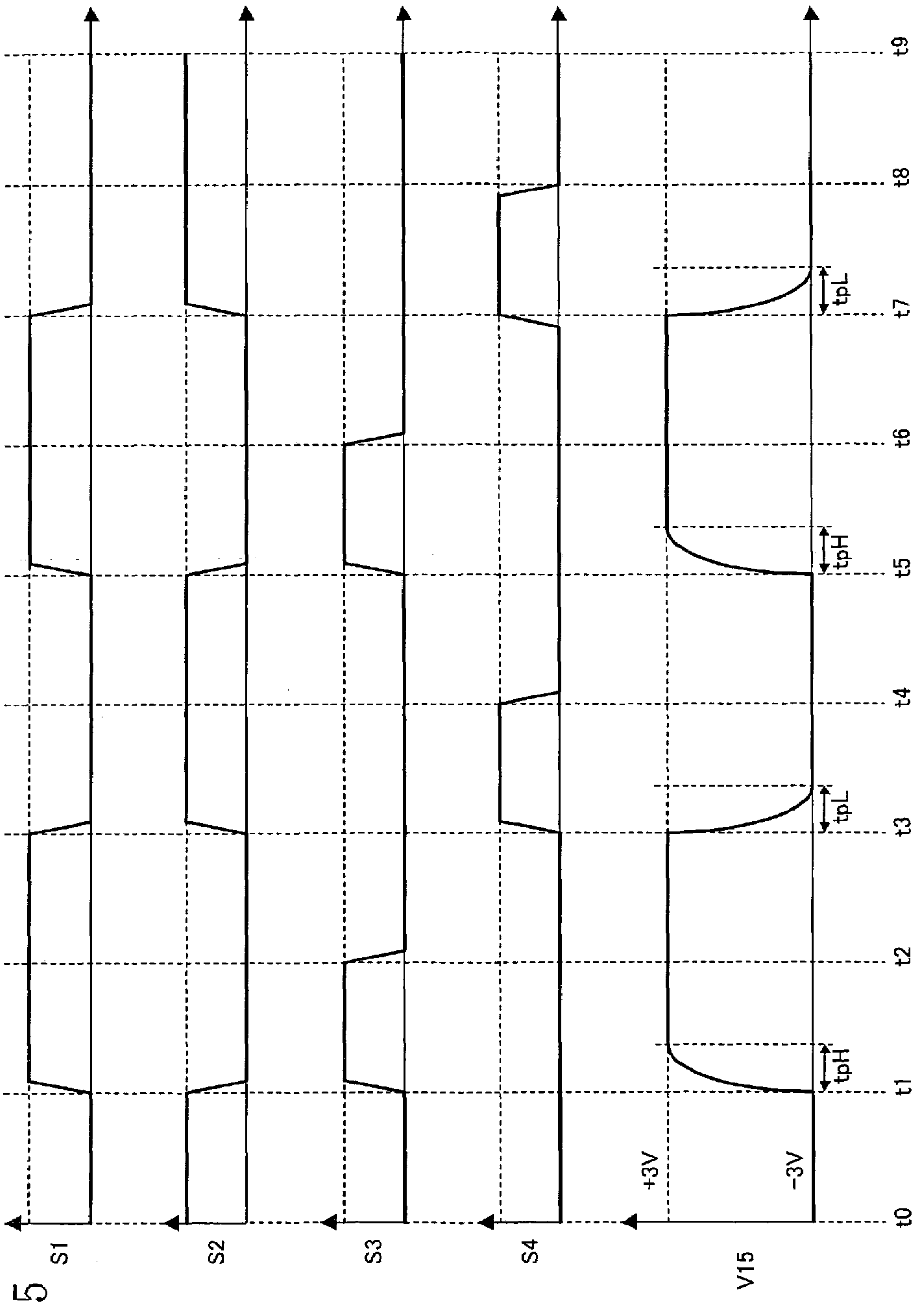
FIG. 5 is a waveform diagram showing control signals S1 to S4 and the voltage at an output terminal 15.

Next, an operation of the driving voltage control device 1 shown in FIG. 1 will be described with reference to FIG. 5. In the illustrated example, the voltage value of the driving voltage VCOMH is "+3 V" and the voltage value of the driving voltage VCOML is "−3 V".

In the period t0-t1, the timing control section 11 keeps the control signal S1 at "L level" and the control signal S2 at "H level". Moreover, in the period t0-t1, a voltage V15 at the output terminal 15 is "−3 V".

At time t1, the timing control section 11 brings the control signal S1 to "H level" and the control signal S2 to "L level" according to the timing signal TIMING from an external component. Thus, the switch SW1 is turned on, and the output terminal 15 is connected to the VCOMH operational amplifier 13H. Since the voltage V15 at the output terminal 15 (the potential of the panel load C(LC)) is "−3 V", a current flows from the VCOMH operational amplifier 13H to the output terminal 15 (the panel load C(LC)) until the voltage V15 at the output terminal 15 reaches the voltage value of the driving voltage VCOMH ("+3 V") (until the rising time tpH elapses). Moreover, at time t1, the timing control section 11 brings the control signal S3 to "H level". This increases the driving power of the VCOMH operational amplifier 13H, thereby increasing the current flowing from the VCOMH operational amplifier 13H to the output terminal 15 (the panel load C(LC)).

At time t2, the timing control section 11 brings the control signal S3 to "L level". Thus, the driving power of the VCOMH operational amplifier 13H returns back to the normal power.

At time t3, the timing control section 11 brings the control signal S1 to "L level" and the control signal S2 to "H level" according to the timing signal TIMING from an external component. Thus, the switch SW2 is turned on, and the output terminal 15 is connected to the VCOML operational amplifier 13L. Since the voltage V15 at the output terminal 15 is "+3 V", a current flows from the output terminal 15 to the VCOML operational amplifier 13L until the voltage V15 at the output terminal 15 reaches the voltage value of the driving voltage VCOML ("−3 V") (until the falling time tpL elapses). Moreover, at time t3, the timing control section 11 brings the control signal S4 to "H level". This increases the driving power of the VCOML operational amplifier 13L, thereby increasing the current flowing from the output terminal 15 to the VCOML operational amplifier 13L.

At time t4, the timing control section 11 brings the control signal S4 to "L level". Thus, the driving power of the VCOML operational amplifier 13L returns back to the normal power.

Then, in the period t4-t9, an operation similar to that in the period t0-t4 is performed.

As described above, the driving power of the operational amplifier is increased when the output terminal 15 (the panel load C(LC)) needs to be charged/discharged. When the voltage V15 at the output terminal 15 (the potential of the panel load C(LC)) is stable, the driving power of the operational amplifier is not increased.

Effects

As described above, the driving power of the VCOMH operational amplifier 13H (or the VCOML operational amplifier 13L) is increased when the driving voltage output from the output terminal 15 is switched from one to another, whereby the panel load C(LC) can be quickly charged/discharged. Thus, the rising time tpH (or the falling time tpL) can be shortened.

When the voltage V15 at the output terminal 15 (the potential of the panel load C(LC)) is stable, the driving power is not increased. Thus, no excessive current flows between the VCOMH operational amplifier 13HH (or the VCOML operational amplifier 13L) and the output terminal 15 when the output terminal 15 (the panel load C(LC)) does not need to be charged/discharged, whereby the power consumption can be reduced.

While the present embodiment is directed to a case where the on period of the control signals S3 and S4 is ½ that of the control signals S1 and S2, the present invention is not limited to this. The advantageous effects of the present invention can be obtained as long as the on period of the control signals S3 and S4 is shorter than or equal to that of the control signals S1 and S2.

Figure 6A:
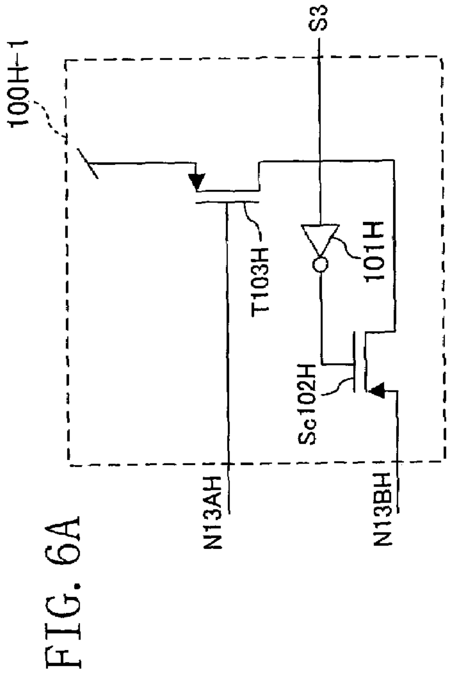
FIG. 6A shows a variation of the driving power adjustment section 100H shown in FIG. 3.
Figure 6B:
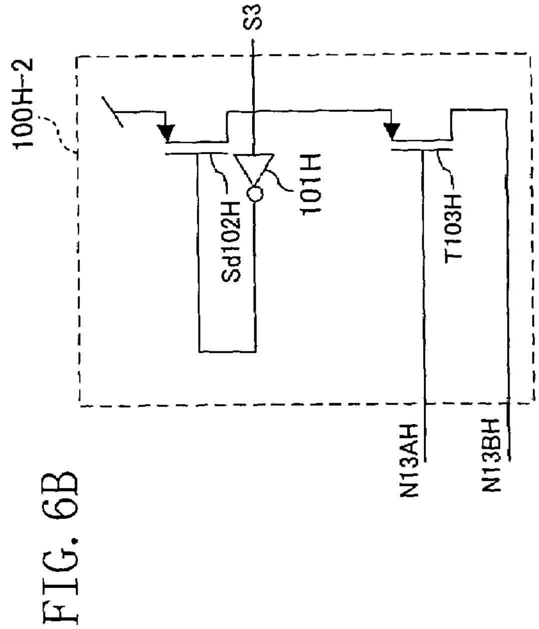
FIG. 6B shows a variation of the driving power adjustment section 100H shown in FIG. 3.

Similar effects can be obtained by using a driving power adjustment section 100H-1 shown in FIG. 6A or a driving power adjustment section 10011-2 shown in FIG. 6B, instead of the driving power adjustment section 100H shown in FIG. 3. A switching transistor Sc102H shown in FIG. 6A is connected between the adjustment transistor T103H and the node N13BH, and receives at the gate thereof the output of the inverter 101H. A switching transistor Sd102H shown in FIG. 6B is connected between a power supply node and the adjustment transistor T103H, and receives at the gate thereof the output of the inverter 101H. Thus, the advantageous effects of the present invention can be obtained as long as a current flows between the adjustment transistor T103H and the node N13BH when the control signal S3 is at "H level".

Figure 6C:
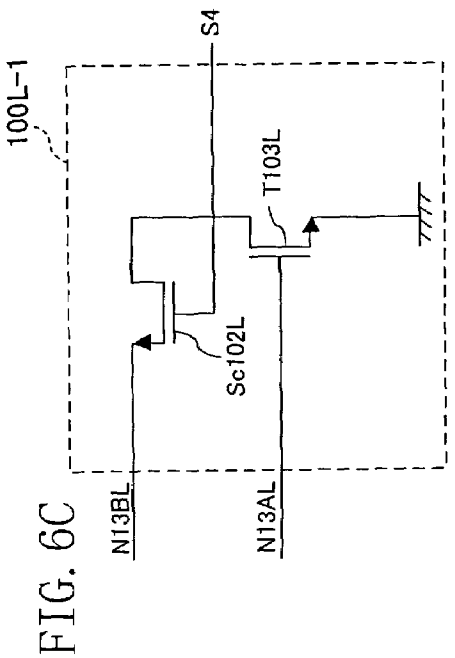
FIG. 6C shows a variation of the driving power adjustment section 100L shown in FIG. 4.
Figure 6D:
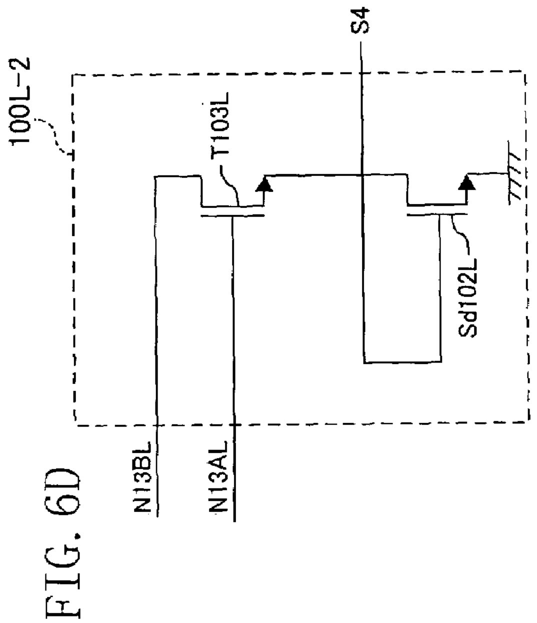
FIG. 6D shows a variation of the driving power adjustment section 100L shown in FIG. 4.

Similarly, similar effects can be obtained by using a driving power adjustment section 100L-1 shown in FIG. 6C or a driving power adjustment section 100L-2 shown in FIG. 6D, instead of the driving power adjustment section 100L shown in FIG. 4. A switching transistor Sc102L shown in FIG. 6C is connected between the adjustment transistor T103L and the node N13BL, and receives at the gate thereof the control signal S4. A switching transistor Sd102L shown in FIG. 6D is connected between a ground node and the adjustment transistor T103L, and receives at the gate thereof the control signal S4. Thus, the advantageous effects of the present invention can be obtained as long as a current flows between the adjustment transistor T103L and the node N13BL when the control signal S4 is at "H level".

Moreover, the internal configuration of the VCOM voltage generation section 12 is not limited to that shown in FIG. 2. For example, the driving voltage VCOMH may be directly supplied from a predetermined power supply to the VCOMH operational amplifier 13H.

Second Embodiment

When only the driving power of the output transistor TB1-H is increased in the VCOMH operational amplifier 13H, an oscillation may occur. This similarly applies to the VCOML operational amplifier 13L.

General Configuration

Figure 7:
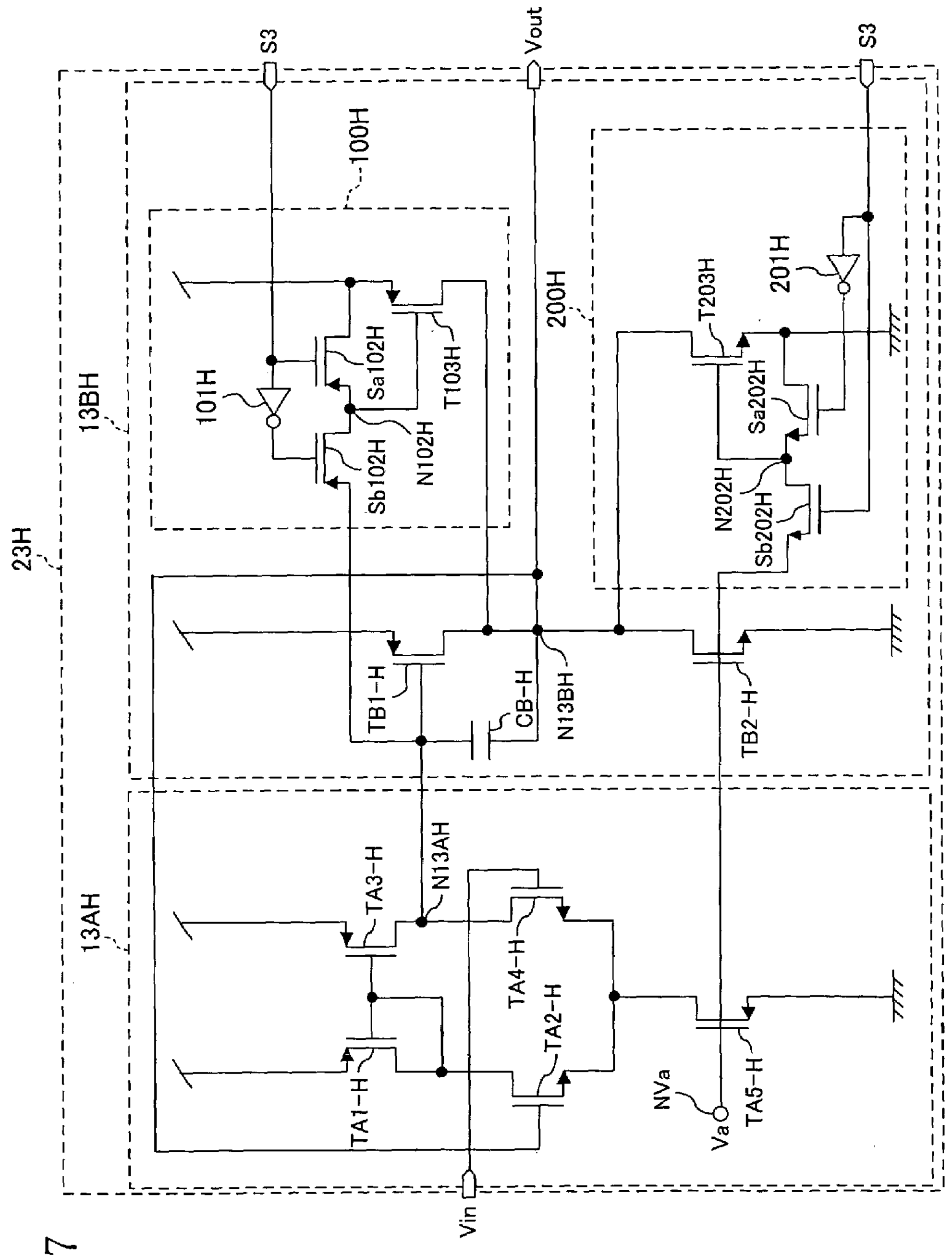
FIG. 7 shows an internal configuration of a VCOMH operational amplifier 23H used in a second embodiment of the present invention.
Figure 8:
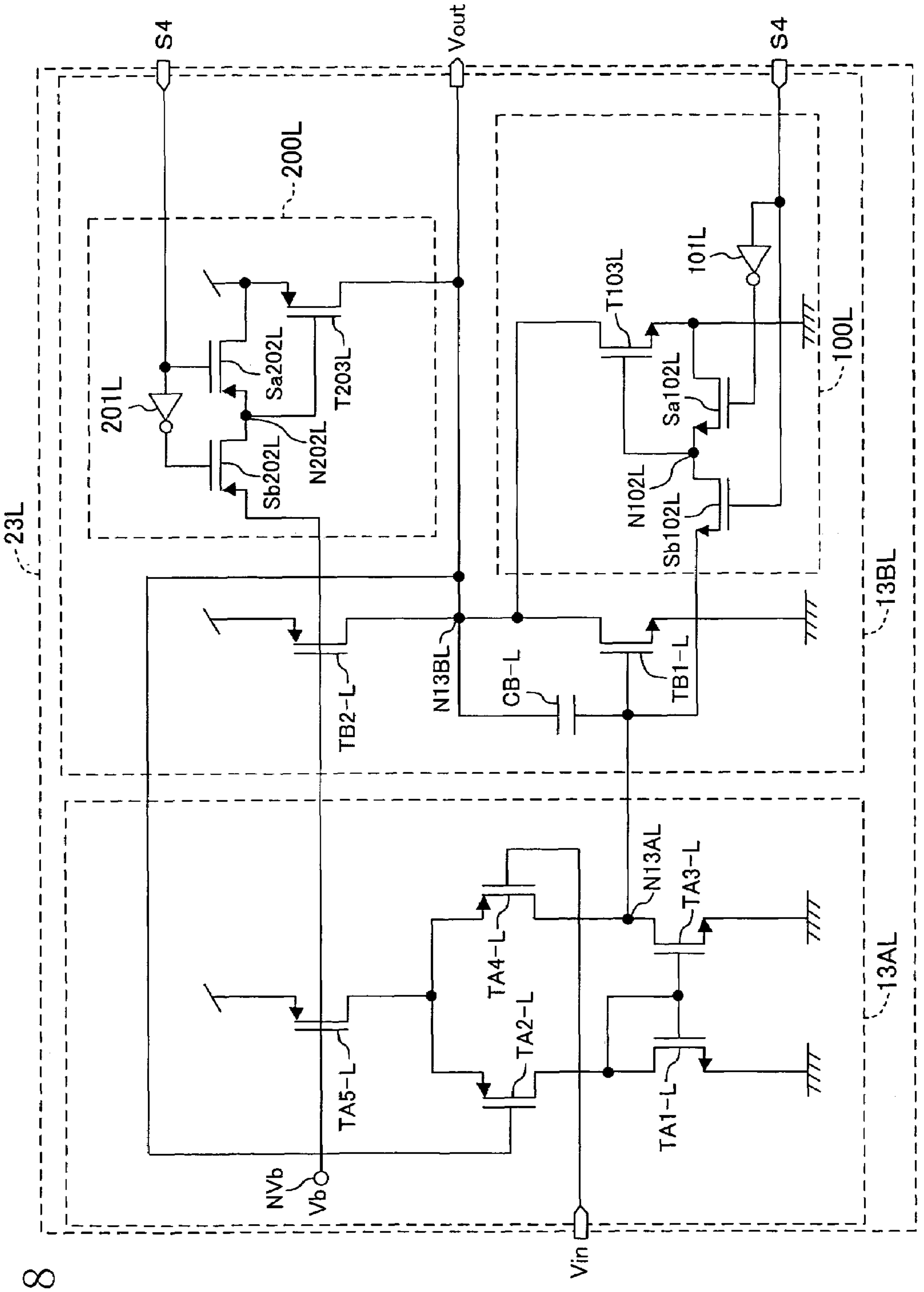
FIG. 8 shows an internal configuration of a VCOML operational amplifier 23L used in the second embodiment of the present invention.

A driving voltage control device according to a second embodiment of the present invention includes a VCOMH operational amplifier 231H shown in FIG. 7 and a VCOML operational amplifier 23L shown in FIG. 8, instead of the VCOMH operational amplifier 13H and the VCOML operational amplifier 13L shown in FIG. 1. Other than this, the configuration is similar to that shown in FIG. 1.

Internal Configuration of VCOMH Operational Amplifier 23H

FIG. 7 shows an internal configuration of the VCOMH operational amplifier 23H used in the present embodiment. The VCOMH operational amplifier 23H includes a driving power adjustment section 200H, in addition to the VCOMH operational amplifier 13H shown in FIG. 3.

The driving power adjustment section 200H includes an inverter 201H, switching transistors Sa202H and Sb202H and an adjustment transistor T203H.

The inverter 201H inverts the control signal S3 from an external component (the timing control section 11).

The switching transistors Sa202H and Sb202H are connected in series with each other between a ground node and the bias voltage supply node NVa. The switching transistor Sa202H is connected between the ground node and the switching transistor Sb202H, and receives at the gate thereof a signal output from the inverter 201H. The switching transistor Sb202H is connected between the switching transistor Sa202H and the bias voltage supply node NVa, and receives at the gate thereof the control signal S3 from an external component (the timing control section 11).

The adjustment transistor T203H is connected between the ground node and the node N13BH, and the gate thereof is connected to a node N202H. The node N202H is an interconnection node between the switching transistor Sa202H and the switching transistor Sb202H.

The control signal S3 being at "L level" is a voltage that activates the switching transistors Sa102H and Sb102H (P-channel transistors) and does not activate the switching transistors Sa202H and Sb202H (N-channel transistors), and the control signal S3 being at "H level" is a voltage that does not activate the switching transistors Sa102H and Sb102H (P-channel transistors) and activates the switching transistors Sa202H and Sb202H (N-channel transistors).

Internal Configuration of VCOML Operational Amplifier 23L

FIG. 8 shows an internal configuration of the VCOML operational amplifier 23L used in the present embodiment. The VCOML operational amplifier 23L includes a driving power adjustment section 200L, in addition to the VCOML operational amplifier 13L shown in FIG. 4.

The driving power adjustment section 200L includes an inverter 201L, switching transistors Sa202L and Sb202L and an adjustment transistor T203L.

The inverter 201L inverts the control signal S4 from an external component (the timing control section 11).

The switching transistors Sa202L and Sb202L are connected in series with each other between a power supply node and the bias-voltage supply node NVb. The switching transistor Sa202L is connected between the power supply node and the switching transistor Sb202L, and receives at the gate thereof the control signal S4 from an external component (the timing control section 11). The switching transistor Sb202L is connected between the switching transistor Sa202L and the bias voltage supply node NVb, and receives at the gate thereof a signal output from the inverter 201L.

The adjustment transistor T203L is connected between the power supply node and the node N13BL, and the gate thereof is connected to a node N202L. The node N202L is an interconnection node between the switching transistor Sa202L and the switching transistor Sb202L.

The control signal S4 being at "H level" is a voltage that activates the switching transistors Sa102L and Sb102L (N-channel transistors) and does not activate the switching transistors Sa202L and Sb202L (P-channel transistors), and the control signal S4 being at "L level" is a voltage that does not activate the switching transistors Sa102L and Sb102L (N-channel transistors) and activates the switching transistors Sa202L and Sb202L (P-channel transistors).

Operation of VCOMH Operational Amplifier 23H

Next, an operation of the VCOMH operational amplifier 23H shown in FIG. 7 will be described. The operation of the VCOMH operational amplifier 23H is similar to that of the VCOMH operational amplifier 13H shown in FIG. 3 except for the operation of the driving power adjustment section 200H.

When the control signal S3 is at "L level", the inverter 201H outputs an inverted version of the control signal S3 ("H level"), whereby the switching transistor Sa202H is on. Moreover, when the control signal S3 is at "L level", the switching transistor Sb202H is off. Therefore, the gate of the adjustment transistor T203H is connected to the ground node, and thus the gate and the source of the adjustment transistor T203H will be at the same potential, whereby no current flows through the adjustment transistor T203H.

When the control signal S3 is at "H level", the inverter 201H outputs an inverted version of the control signal S3 ("L level"), whereby the switching transistor Sa202H is off. Moreover, when the control signal S3 is at "H level", the switching transistor Sb202H is on. Therefore, the gate of the adjustment transistor T203H is connected to the bias voltage supply node NVa, whereby a current flows from the node N13BH to the adjustment transistor T203H.

Thus, when the control signal S3 is at "H level", the current flowing from the node N13BH to the ground node increases. In other words, the driving power of the output transistor TB1-H increases, and the driving power of the output transistor TB2-H also increases.

Operation of the VCOML Operational Amplifier 23L

Next, an operation of the VCOML operational amplifier 23L shown in FIG. 8 will be described.

When the control signal S4 is at "L level", the switching transistor Sa202L is on. Moreover, when the control signal S4 is at "L level", the inverter 201L outputs an inverted version of the control signal S4 ("H level"), whereby the switching transistor Sb202L is off. Therefore, the gate of the adjustment transistor T203L is connected to the power supply node, and thus the gate and the source of the adjustment transistor T203L will be at the same potential, whereby no current flows through the adjustment transistor T203L.

When the control signal S4 is at "H level", the switching transistor Sa202L is off. Moreover, when the control signal S4 is at "H level", the inverter 201L outputs an inverted version of the control signal S4 ("L level"), whereby the switching transistor Sb202L is on. Therefore, the gate of the adjustment transistor T203L is connected to the bias voltage supply node NVb, whereby a current flows from the adjustment transistor T203L to the node N13BL.

Thus, when the control signal S4 is at "H level", the current flowing from the power supply node to the node N13BL increases. In other words, the driving power of the output transistor TB1-L increases, and the driving power of the output transistor TB2-L also increases.

Effects

As described above, the driving power of the VCOMH operational amplifier 23H (or the VCOML operational amplifier 23L) is increased when the driving voltage output from the output terminal 15 is switched from one to another, whereby the panel load C(LC) can be quickly charged/discharged. Thus, the rising time tpH (or the falling time tpL) can be shortened.

When the voltage V15 at the output terminal 15 (the potential of the panel load C(LC)) is stable, the driving power is not increased. Thus, no excessive current flows between the VCOMH operational amplifier 23H (or the VCOML operational amplifier 23L) and the output terminal 15 when the output terminal 15 (the panel load C(LC)) does not need to be charged/discharged, whereby the power consumption can be reduced.

Moreover, by increasing the driving power of the output transistor TB2-H (or TB2-L) along with the increase in the driving power of the output transistor TB1-H (or TB1-L), it is possible to suppress an oscillation.

Moreover, by setting the adjustment transistor T203H (T203L) according to the adjustment transistor T103H (T103L) (e.g., setting the size ratio (relationship of W/L ratios of each transistors) between the adjustment transistor T103H (T103L) and the adjustment transistor T203H (T203L) to be the same as that between the output transistor TB1-H (TB1-L) and the output transistor TB2-H (TB2-L)), it is possible to reduce the offset voltage that the VCOMH differential amplifier circuit 23H (VCOMH differential amplifier circuit 23L) has.

Effects similar to those of the VCOMH operational amplifier 13H shown in FIG. 3 can be obtained also when only the driving power adjustment section 200H is provided without providing the driving power adjustment section 100H in the VCOMH operational amplifier 23H shown in FIG. 7. Moreover, effects similar to those of the VCOML operational amplifier 13L shown in FIG. 4 can be obtained also when only the driving power adjustment section 200L is provided without providing the driving power adjustment section 100L in the VCOML operational amplifier 23L shown in FIG. 8.

Figure 9A:
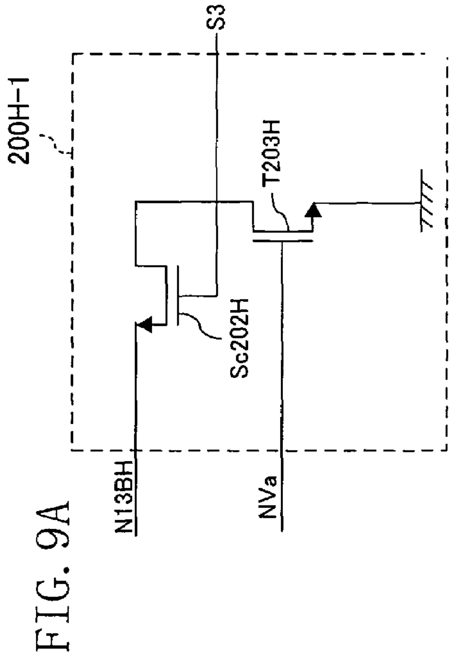
FIG. 9A shows a variation of the driving power adjustment section 200H shown in FIG. 7.
Figure 9B:
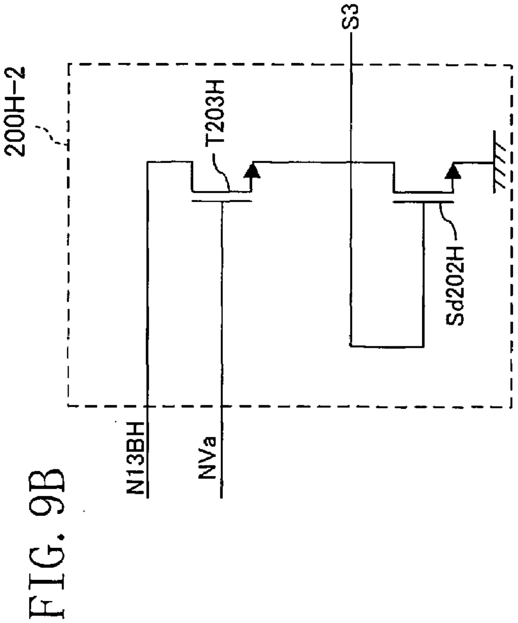
FIG. 9B shows a variation of the driving power adjustment section 200H shown in FIG. 7.

Similar effects can be obtained by using the driving power adjustment section 200H-1 shown in FIG. 9A or the driving power adjustment section 200H-2 shown in FIG. 9B, instead of the driving power adjustment section 200H shown in FIG. 7. The switching transistor Sc202H shown in FIG. 9A is connected between the adjustment transistor T203H and the node N13BH, and receives at the gate thereof the control signal S3. The switching transistor Sd202H shown in FIG. 9B is connected between a ground node and the adjustment transistor T203H, and receives at the gate thereof the control signal S3. Thus, the advantageous effects of the present invention can be obtained as long as a current flows between the adjustment transistor T203H and the node N13BH when the control signal S3 is at "H level".

Figure 9C:
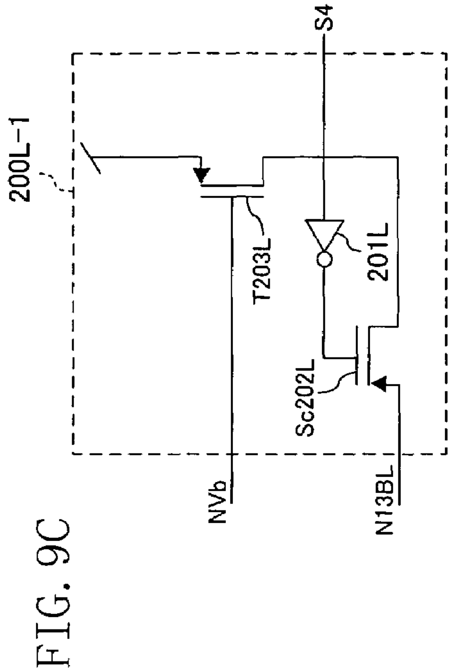
FIG. 9C shows a variation of the driving power adjustment section 200L shown in FIG. 8.
Figure 9D:
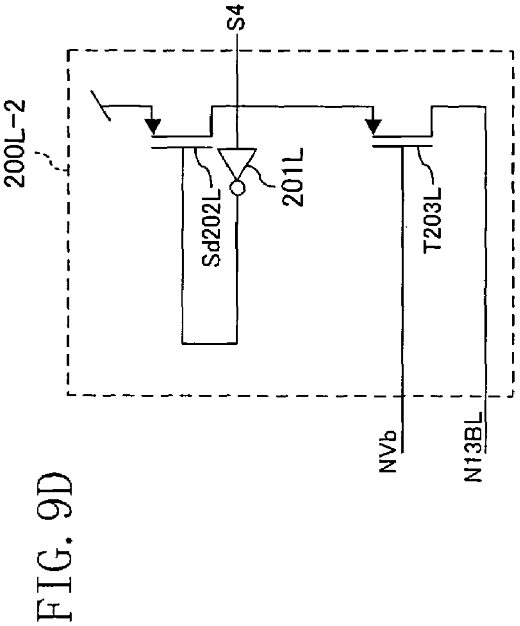
FIG. 9D shows a variation of the driving power adjustment section 200L shown in FIG. 8.

Similarly, similar effects can be obtained by using the driving power adjustment section 200L-1 shown in FIG. 9C or the driving power adjustment section 200L-2 shown in FIG. 9D, instead of the driving power adjustment section 200L shown in FIG. 8. The switching transistor Sc202L shown in FIG. 9C is connected between the adjustment transistor T203L and the node N13BL, and receives at the gate thereof the output of the inverter 201L. The switching transistor Sd202L shown in FIG. 9D is connected between a power supply node and the adjustment transistor T203L, and receives at the gate thereof the output of the inverter 201L. Thus, the advantageous effects of the present invention can be obtained as long as a current flows between the adjustment transistor T203L and the node N13BL when the control signal S4 is at "H level".

Third Embodiment

General Configuration

Figure 10:
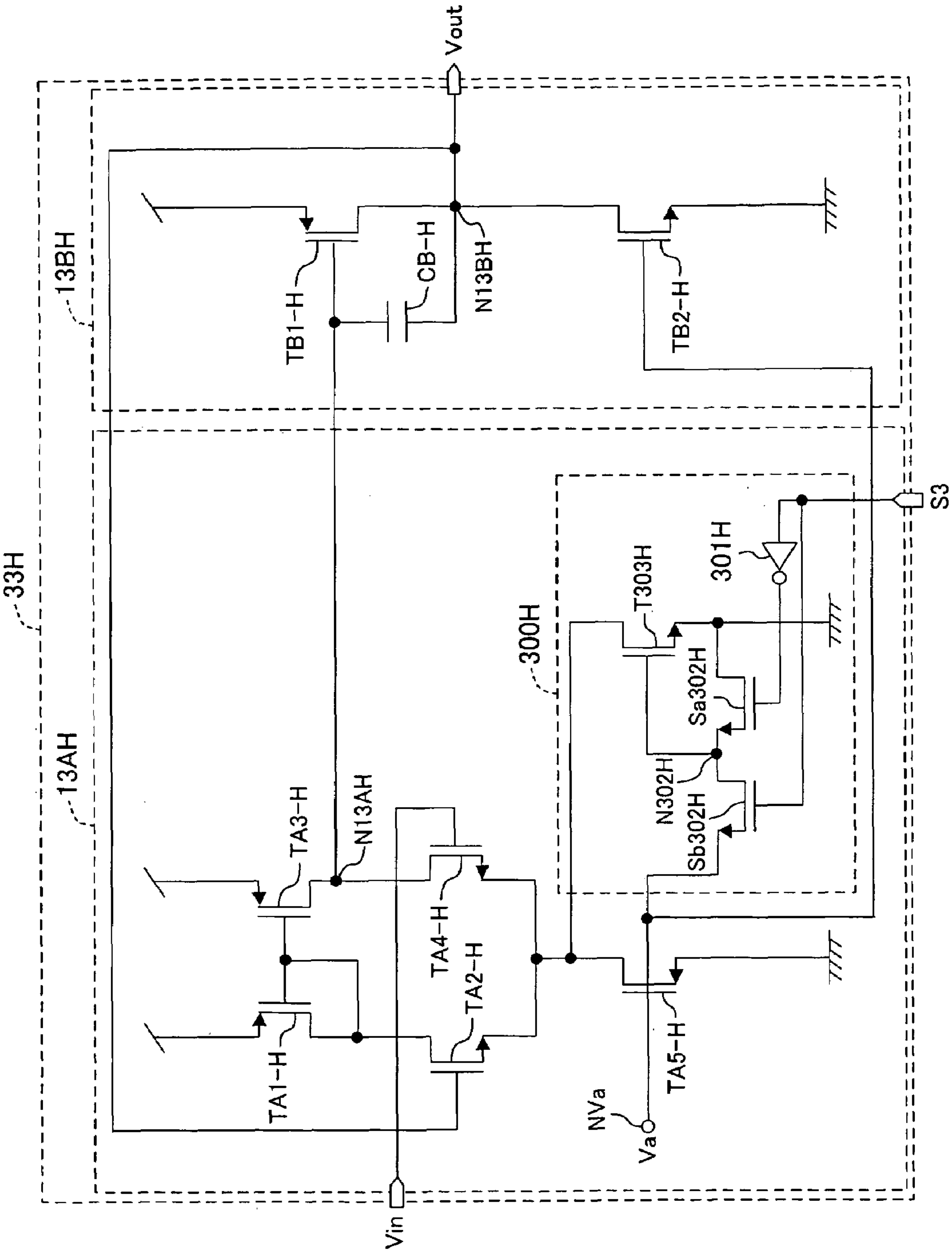
FIG. 10 shows an internal configuration of a VCOMH operational amplifier 33H used in a third embodiment of the present invention.
Figure 11:
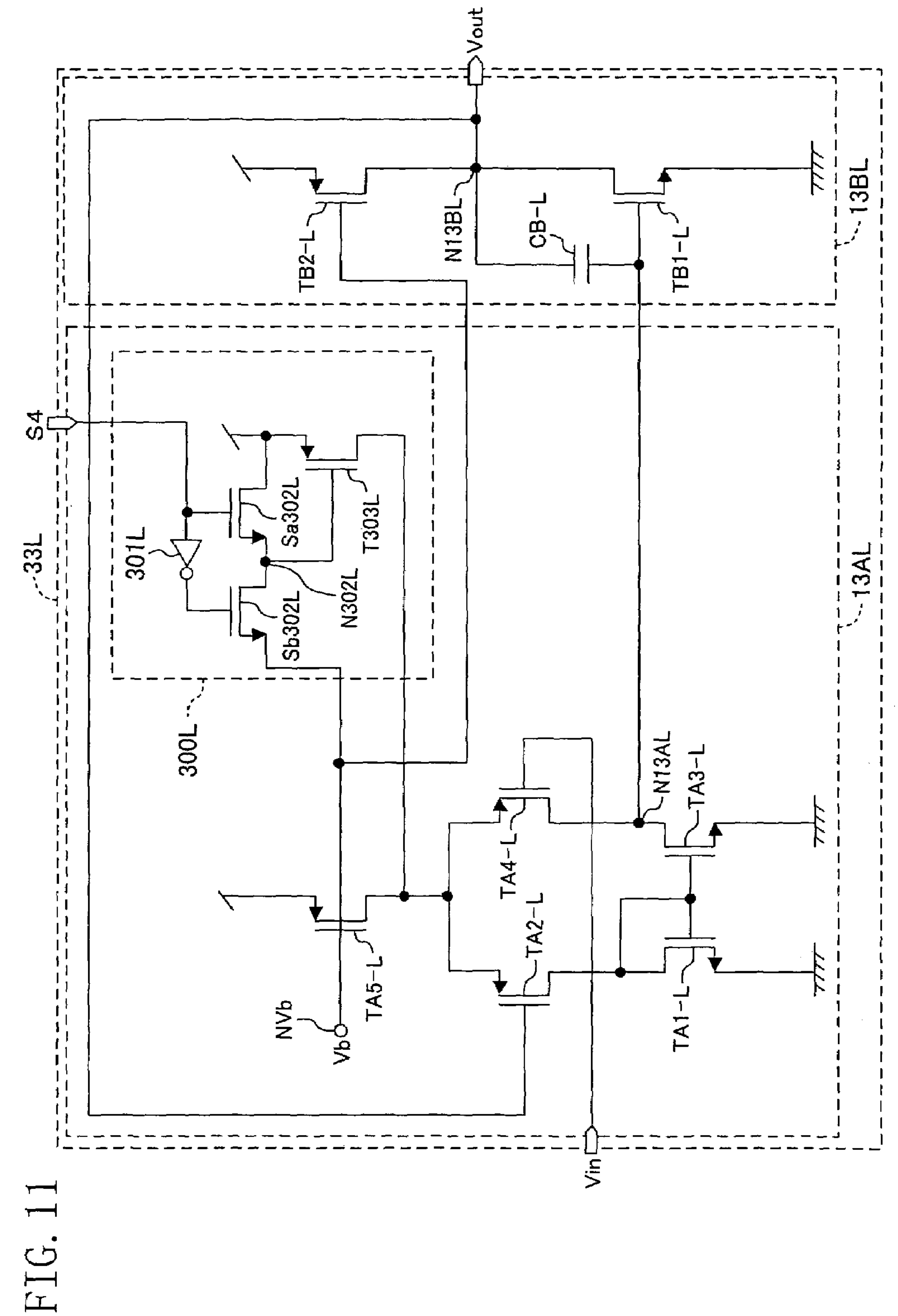
FIG. 11 shows an internal configuration of a VCOML operational amplifier 33L used in the third embodiment of the present invention.

A driving voltage control device according to a third embodiment of the present invention includes a VCOMH operational amplifier 33H shown in FIG. 10 and a VCOML operational amplifier 33L shown in FIG. 11, instead of the VCOM operational amplifier 13H and the VCOML operational amplifier 13L shown in FIG. 1. Other than this, the configuration is similar to that shown in FIG. 1.

Internal Configuration of VCOMH Operational Amplifier 33H

FIG. 10 shows an internal configuration of the VCOMH operational amplifier 33H used in the present embodiment. The VCOMH operational amplifier 33H includes a driving power adjustment section 300H, instead of the driving power adjustment section 100H shown in FIG. 3.

The driving power adjustment section 300H includes an inverter 301H, switching transistors Sa302H and Sb302H and an adjustment transistor T303H.

The inverter 301H inverts the control signal S3 from an external component (the timing control section 11).

The switching transistors Sa302H and Sb302H are connected in series with each other between a ground node and the bias voltage supply node NVa. The switching transistor Sa302H is connected between the ground node and the switching transistor Sb302H, and receives at the gate thereof a signal output from the inverter 301H. The switching transistor Sb302H is connected between the switching transistor Sa302H and the bias voltage supply node NVa, and receives at the gate thereof the control signal S3 from an external component (the timing control section 11).

The adjustment transistor T303H is connected between the ground node and the drain of the input transistor TA5-H, and the gate thereof is connected to a node N302H. The node N302H is an interconnection node between the switching transistor Sa302H and the switching transistor Sb302H.

Internal Configuration of VCOML Operational Amplifier 33L

FIG. 11 shows an internal configuration of the VCOML operational amplifier 33L used in the present embodiment. The VCOML operational amplifier 33L includes a driving power adjustment section 300L, instead of the driving power adjustment section 100L shown in FIG. 4.

The driving power adjustment section 300L includes an inverter 301L, switching transistors Sa302L and Sb302L and an adjustment transistor T303L.

The inverter 301L inverts the control signal S4 from an external component (the timing control section 11).

The switching transistors Sa302L and Sb302L are connected in series with each other between a power supply node and the bias voltage supply node NVb. The switching transistor Sa302L is connected between the power supply node and the switching transistor Sb302L, and receives at the gate thereof the control signal S4 from an external component (the timing control section 11). The switching transistor Sb302L is connected between the switching transistor Sa302L and the bias voltage supply node NVb, and receives at the gate thereof a signal output from the inverter 301L.

The adjustment transistor T303L is connected between the power supply node and the drain of the input transistor TA5-L, and the gate thereof is connected to a node N302L. The node N302L is an interconnection node between the switching transistor Sa302L and the switching transistor Sb302L.

Operation of VCOMH Operational Amplifier 33H

Next, an operation of the VCOMH operational amplifier 33H shown in FIG. 10 will be described.

When the control signal S3 is at "L level", the inverter 301H outputs an inverted version of the control signal S3 ("H level"), whereby the switching transistor Sa302H is on. Moreover, when the control signal S3 is at "L level", the switching transistor Sb302H is off. Therefore, the gate of the adjustment transistor T303H is connected to the ground node, and thus the gate and the source of the adjustment transistor T303H will be at the same potential, whereby no drain current flows through the adjustment transistor T303H.

When the control signal S3 is at "H level", the inverter 301H outputs an inverted version of the control signal S3 ("L level"), whereby the switching transistor Sa302H is off. Moreover, when the control signal S3 is at "H level", the switching transistor Sb302H is on. Therefore, the gate of the adjustment transistor T303H is connected to the bias voltage supply node NVa, whereby the current flowing through the input transistors TA3-H and TA4-H increases. Thus, the current flowing from the node N13AH to the phase compensation capacitor CB-H increases.

Thus, when the control signal S3 is at "H level", the current flowing from the node N13AH to the phase compensation capacitor CB-1 increases, whereby the amount of time required for charging the phase compensation capacitor CB-H is shortened.

Operation of VCOML Operational Amplifier 33L

Next, an operation of the VCOML operational amplifier 33L shown in FIG. 11 will be described.

When the control signal S4 is at "L level", the switching transistor Sa302L is on. Moreover, when the control signal S4 is at "L level", the inverter 301L outputs an inverted version of the control signal S4 ("H level"), whereby the switching transistor Sb302L is off. Therefore, the gate of the adjustment transistor T303L is connected to the power supply node, and thus the gate and the source of the adjustment transistor T303L will be at the same potential, whereby no current flows through the adjustment transistor T303L.

When the control signal S4 is at "H level", the switching transistor Sa302H is off Moreover, when the control signal S4 is at "H level", the inverter 301L outputs an inverted version of the control signal S4 ("L level"), whereby the switching transistor Sb302L is on. Therefore, the gate of the adjustment transistor T303L is connected to the bias voltage supply node NVb, whereby the current flowing through the input transistors TA3-L and TA4-L increases. Thus, the current flowing from the phase compensation capacitor CB-L to the node N13AL increases.

Thus, when the control signal S4 is at "H level", the current flowing from the phase compensation capacitor CB-L to the node N13AL increases, whereby the amount of time required for discharging the phase compensation capacitor CB-L is shortened.

Effects

As described above, when the driving voltage output from the output terminal 15 is switched from one to another, the phase compensation capacitor CB-H can be charged quickly (or the phase compensation capacitor CB-L can be discharged quickly). Therefore, the potential at the node N13BH can be increased quickly (or the potential at the node N13BL can be decreased quickly), whereby the panel load C(LC) can be quickly charged/discharged. Thus, the rising time tpH (or the falling time tpL) can be shortened.

When the potential V15 at the output terminal 15 (the potential of the panel load C(LC)) is stable, the driving power is not increased. Thus, no excessive current flows between the VCOMH operational amplifier 33H (or the VCOML operational amplifier 33L) and the output terminal 15 when the output terminal 15 (the panel load C(LC)) does not need to be charged/discharged, whereby the power consumption can be reduced.

The driving power adjustment section 100H shown in FIG. 3 and the driving power adjustment section 200H shown in FIG. 7 may be further provided to the VCOMH operational amplifier 33H shown in FIG. 10. With such a configuration, the panel load C(LC) can be charged/discharged even more quickly.

The driving power adjustment section 100L shown in FIG. 4 and the driving power adjustment section 200L shown in FIG. 8 can be further provided to the VCOML operational amplifier 33L shown in FIG. 11.

Figure 12A:
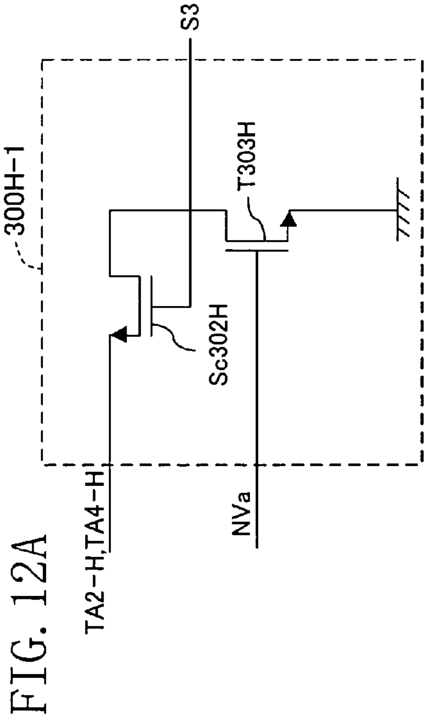
FIG. 12A shows a variation of the driving power adjustment section 300H shown in FIG. 10.
Figure 12B:
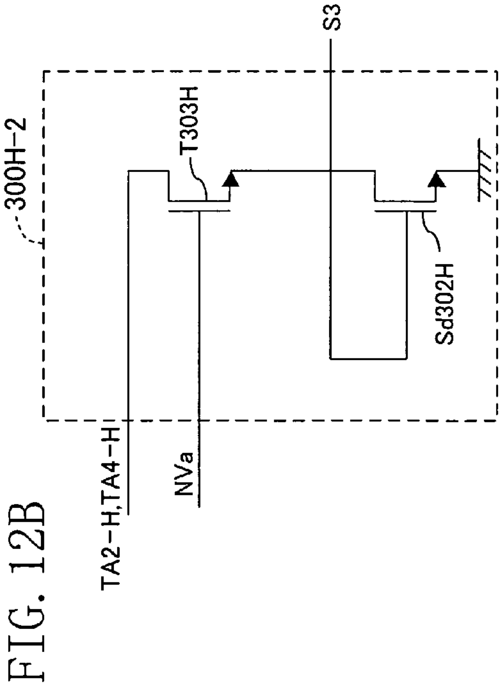
FIG. 12B shows a variation of the driving power adjustment section 300H shown in FIG. 10.

Similar effects can be obtained by using a driving power adjustment section 300H-1 shown in FIG. 12A or a driving power adjustment section 300H-2 shown in FIG. 12B, instead of the driving power adjustment section 300H shown in FIG. 10. A switching transistor Sc302H shown in FIG. 12A is connected between the adjustment transistor T303H and the drain of the input transistor TA5-H (the interconnection node between the input transistor TA2-H and the input transistor TA4-H), and receives at the gate thereof the control signal S3. A switching transistor Sd302H shown in FIG. 12B is connected between a ground node and the adjustment transistor T303H, and receives at the gate thereof the control signal S3. Thus, the advantageous effects of the present invention can be obtained as long as a current flows between the adjustment transistor T303H and the input transistors TA2-H and TA4-H when the control signal S3 is at "H level".

Figure 12C:
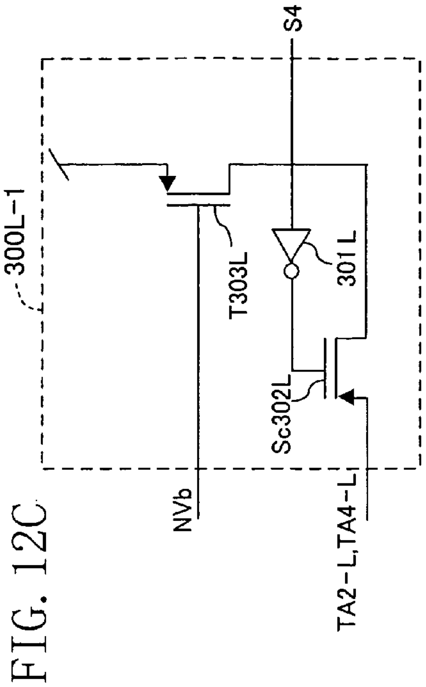
FIG. 12C shows a variation of the driving power adjustment section 300L shown in FIG. 11.
Figure 12D:
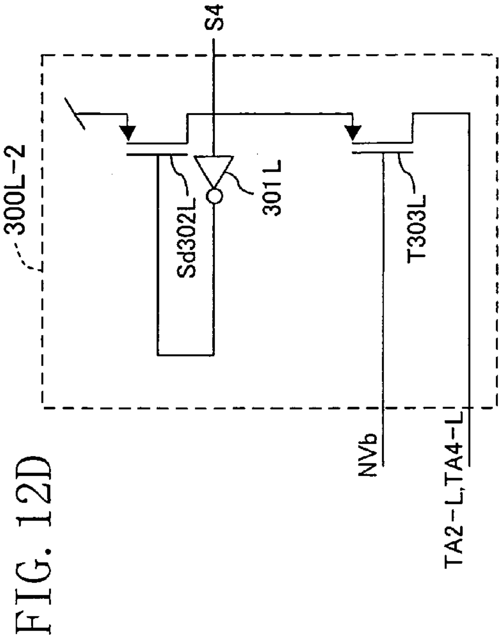
FIG. 12D shows a variation of the driving power adjustment section 300L shown in FIG. 11.

Similarly, similar effects can be obtained by using a driving power adjustment section 300L-1 shown in FIG. 12C or a driving power adjustment section 300L-2 shown in FIG. 12D, instead of the driving power adjustment section 300L shown in FIG. 11. A switching transistor Sc302L shown in FIG. 12C is connected between the adjustment transistor T303L and the drain of the input transistor TA5-L (the interconnection node between the input transistor TA2-L and the input transistor TA4-L), and receives at the gate thereof the output of the inverter 301L. A switching transistor Sd302L shown in FIG. 12D is connected between a power supply node and the adjustment transistor T303L, and receives at the gate thereof the output of the inverter 301L. Thus, the advantageous effects of the present invention can be obtained as long as a current flows between the adjustment transistor T303L and the input transistors TA2-L and TA4-L when the control signal S4 is at "H level".

Fourth Embodiment

General Configuration

Figure 13:
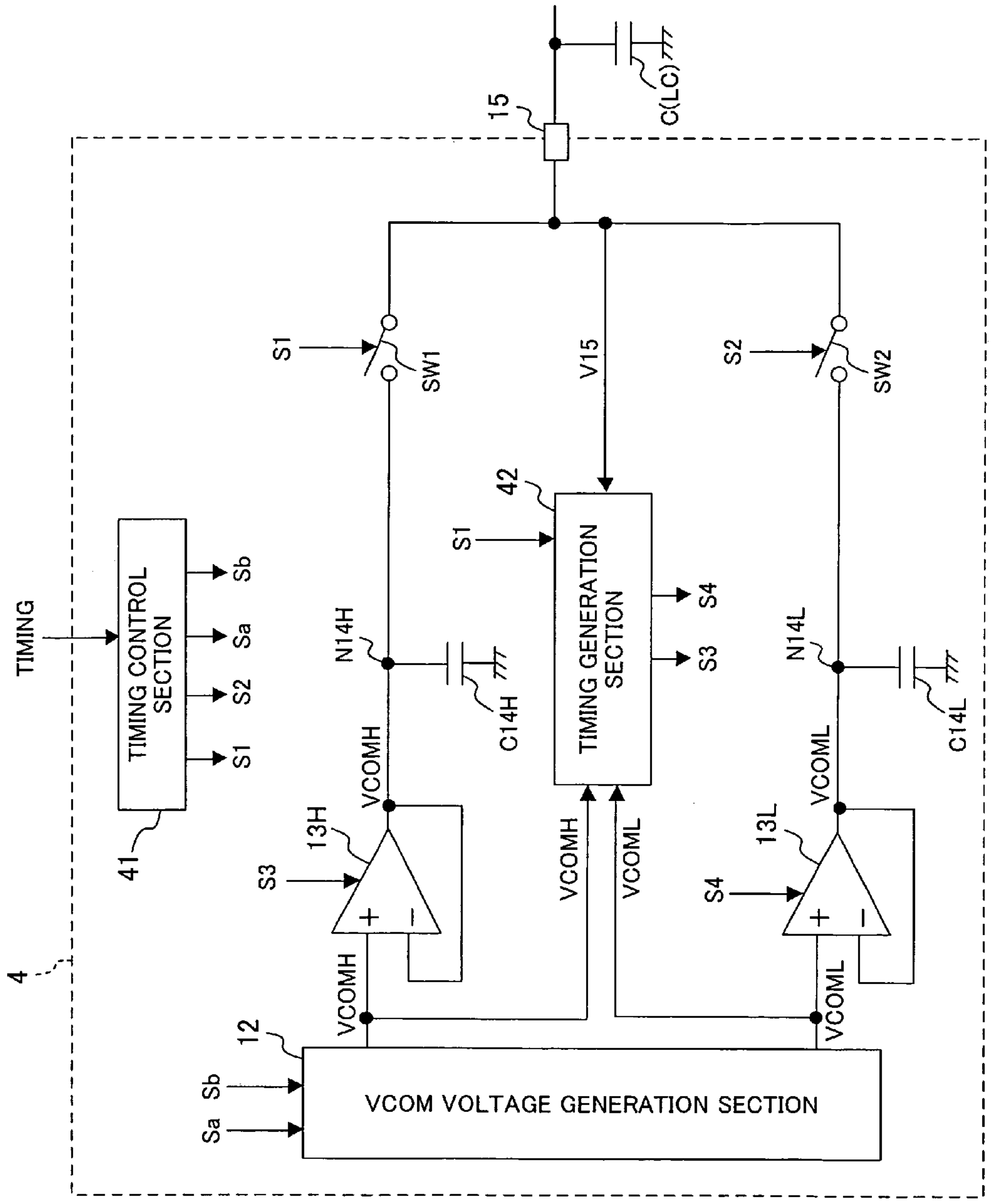
FIG. 13 shows a general configuration of a driving voltage control device 4 according to a fourth embodiment of the present invention.

FIG. 13 shows a general configuration of a driving voltage control device 4 according to a fourth embodiment of the present invention. The device 4 includes a timing control section 41 and a timing generation section 42, instead of the timing control section 11 shown in FIG. 1. Other than this, the configuration is similar to that shown in FIG. 1.

As does the timing control section 11, the timing control section 41 outputs the control signals Sa and Sb to the VCOM voltage generation section 12, and outputs the control signals S1 and S2 according to the timing control signal TIMING from an external component.

The timing generation section 42 outputs the control signals S3 and S4 according to the voltage level of the control signal S1 and the voltage value of the voltage V15 at the output terminal 15.

Internal Configuration of Timing Generation Section 42

Figure 14:
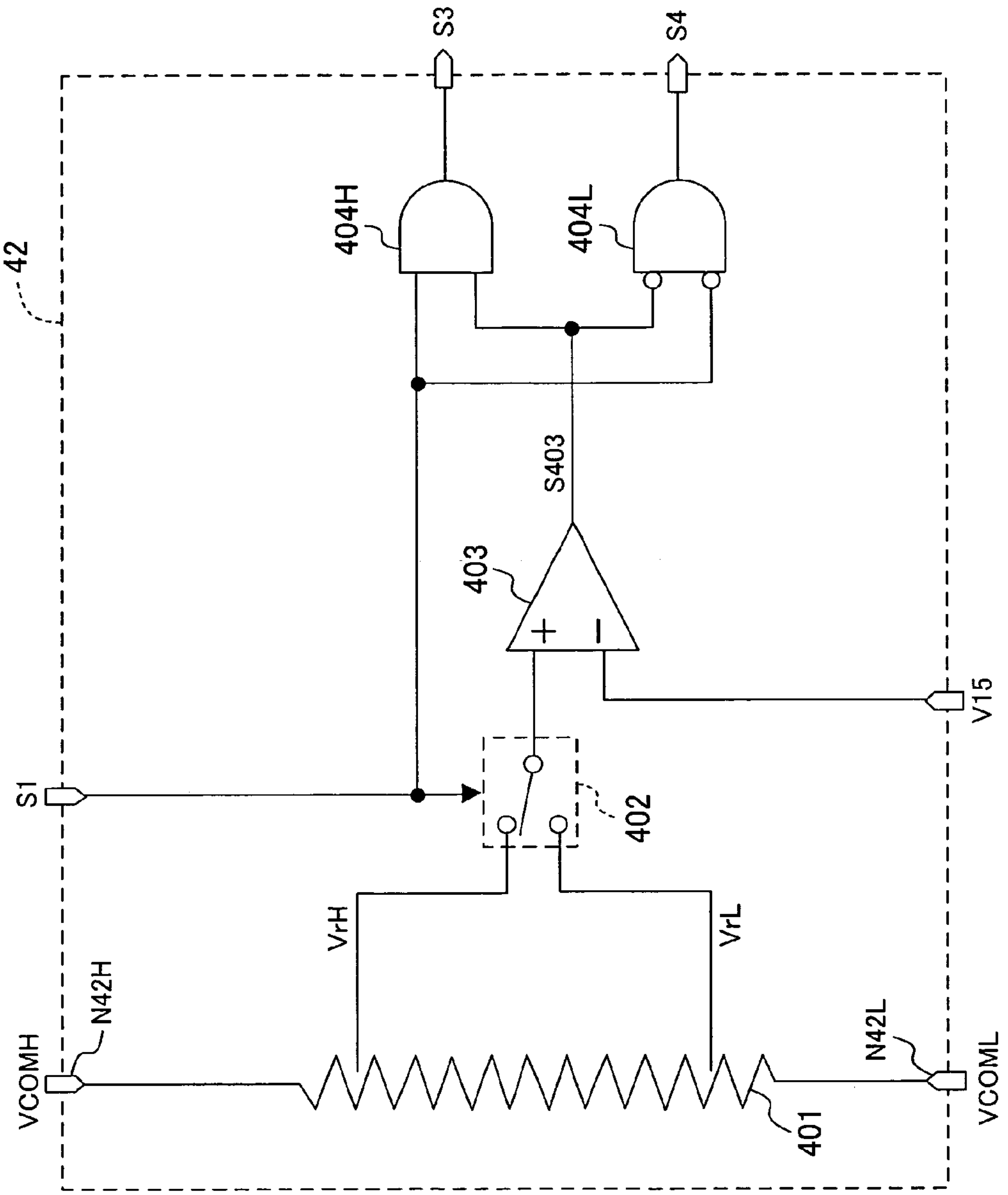
FIG. 14 shows an internal configuration of the timing generation section 42 shown in FIG. 13.

FIG. 14 shows an internal configuration of the timing generation section 42 shown in FIG. 13.

The timing generation section 42 includes the input nodes N42H and N42L, a ladder resistor 401, a switch 402, a comparator 403 and AND circuits 404H and 404L.

The input node N42H receives the driving voltage VCOM generated by the VCOM voltage generation section 12. The input node N42L receives the driving voltage VCOML generated by the VCOM voltage generation section 12.

The ladder resistor 401 is connected between the input node N42H and the input node N42L, and generates a plurality of divided voltages by dividing the voltage between the input node N42H and the input node N42L.

The switch 402 receives one of the divided voltages generated by the ladder resistor 401 as an H-level reference voltage VrH and another one of the divided voltages whose voltage value is lower than the H-level reference voltage VrH as an L-level reference voltage VrL, and receives the control signal S1 from an external component (the timing control section 41). The switch 402 outputs the H-level reference voltage VrH from the ladder resistor 401 to the comparator 403 when the control signal S1 is at "H level", and outputs the L-level reference voltage VrL from the ladder resistor 401 to the comparator 403 when the control signal S1 is at "L level".

The comparator 403 receives at the non-inverted input terminal thereof the voltage output from the switch 402 (the H-level reference voltage VrH or the L-level reference voltage VrL), and receives at the inverted input terminal thereof the voltage V15 from an external component (the output terminal 15). Moreover, the comparator 403 outputs a determination signal S403 indicating "H level" when the voltage V15 from an external component (the output terminal 15) is lower than the voltage output from the switch 402, and outputs the determination signal S403 indicating "L level" when the voltage V15 from the external component (the output terminal 15) is higher than the voltage output from the switch 402.

The AND circuit 404H receives at one input terminal thereof the control signal S1 from an external component (the timing control section 41), and receives at the other input terminal thereof the determination signal S403 output from the comparator 403. Moreover, the AND circuit 404H outputs the control signal S3 indicating "H level" when the control signal S1 from an external component (the timing control section 41) and the determination signal S403 output from the comparator 403 both indicate "H level", and otherwise outputs the control signal S3 indicating "L level".

The AND circuit 404L receives at one input terminal thereof an inverted version of the control signal S1 from an external component (the timing control section 41), and receives at the other input terminal thereof an inverted version of the determination signal S403 output from the comparator 403. Moreover, the AND circuit 404L outputs the control signal S4 indicating "H level" when the control signal S1 from an external component (the timing control section 41) and the determination signal S403 output from the comparator 403 both indicate "L level", and otherwise outputs the control signal S4 indicating "L level".

Operation

Figure 15:
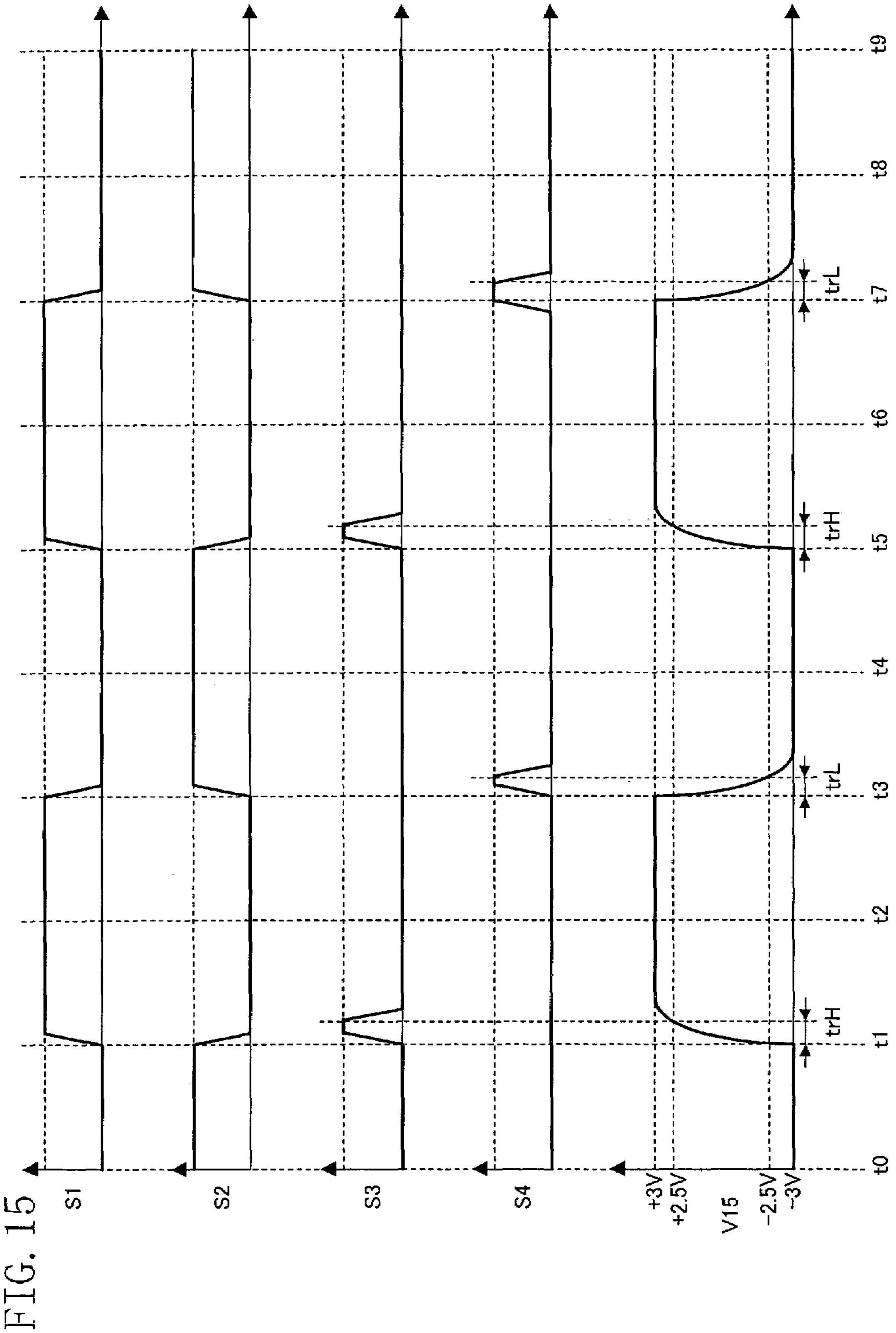
FIG. 15 is a waveform diagram showing the control signals S1 to S4 and the voltage at an output terminal.
Figure 16:
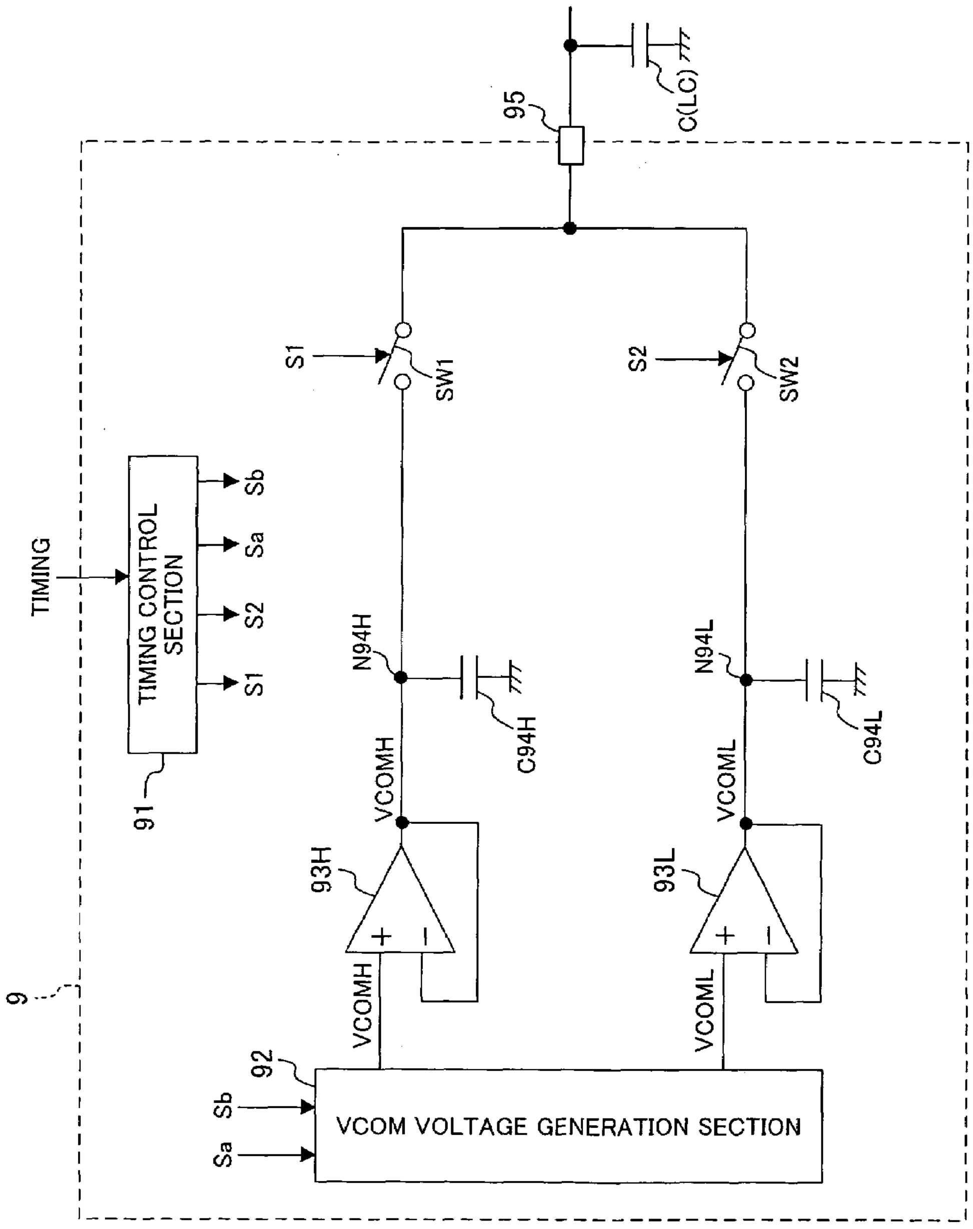
FIG. 16 PRIOR ART
FIG. 16 shows a general configuration of the conventional driving voltage control device 9.
Figure 17:
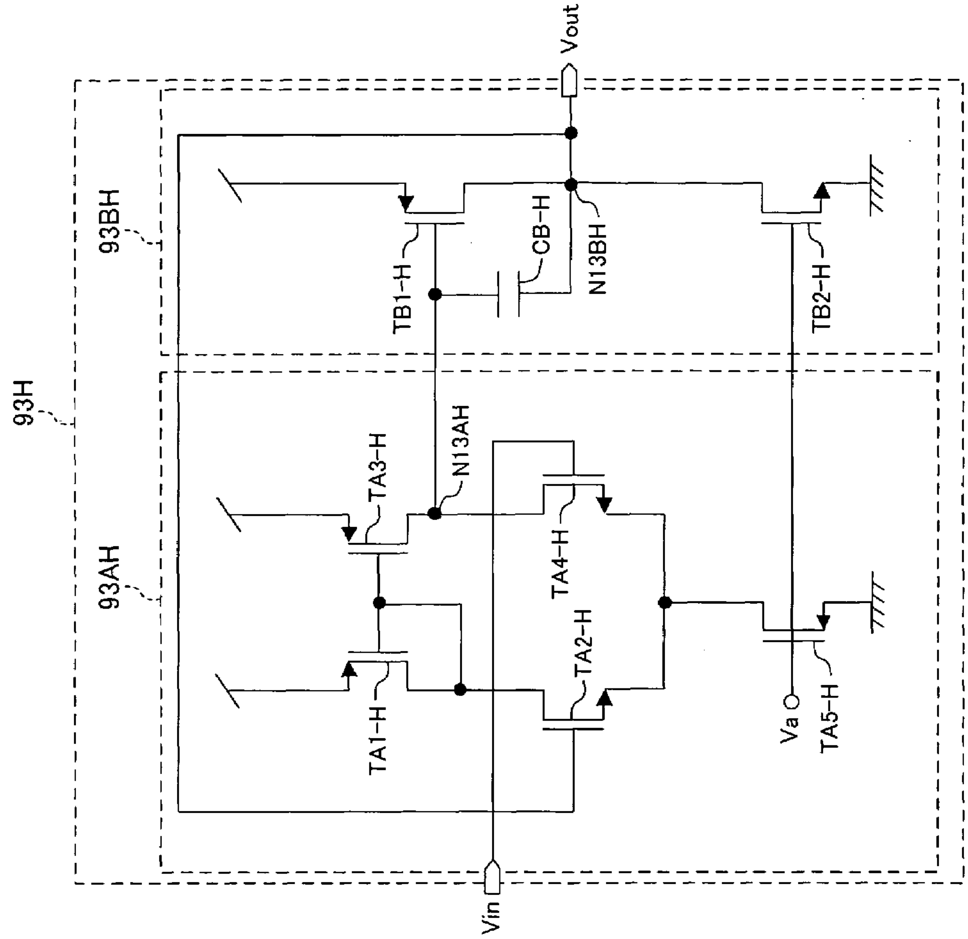
FIG. 17 PRIOR ART
FIG. 17 shows an internal configuration of the VCOMH operational amplifier 93H shown in FIG. 16.
Figure 18:
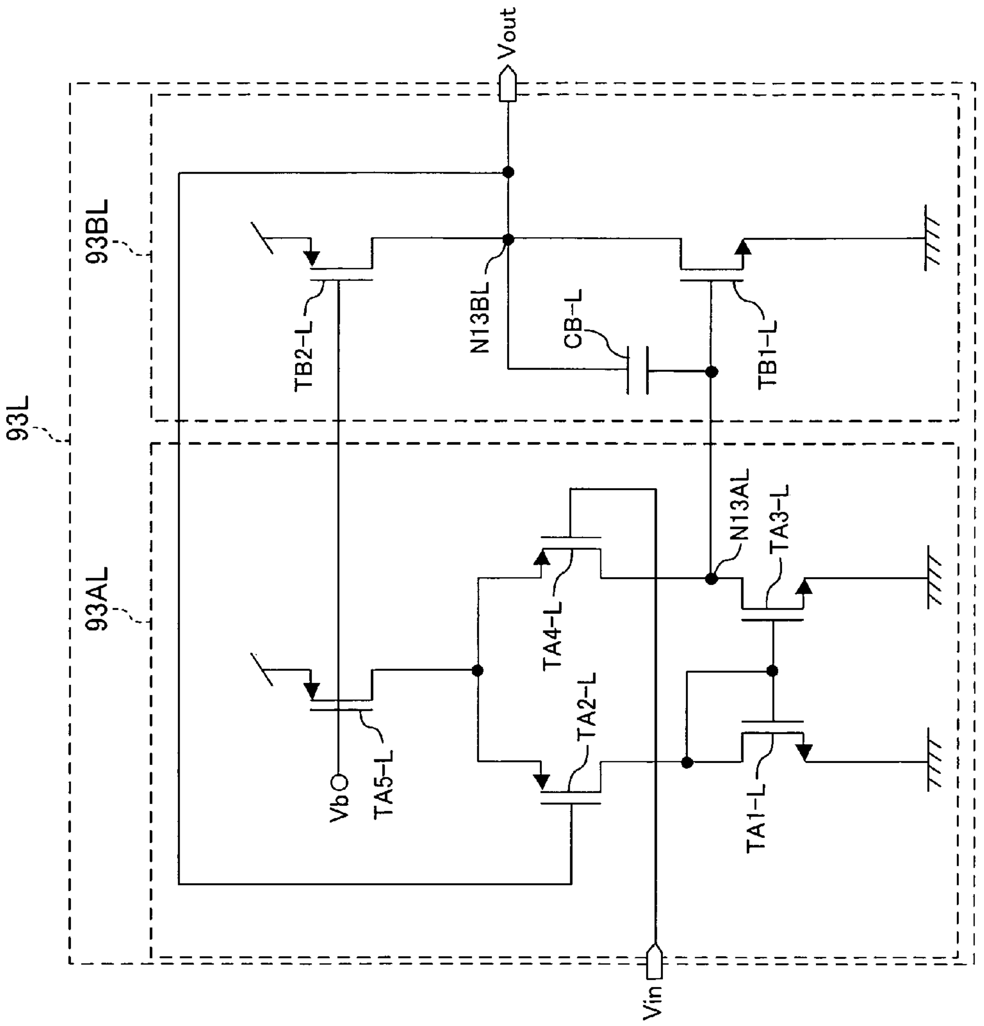
FIG. 18 PRIOR ART
FIG. 18 shows an internal configuration of the VCOML operational amplifier 93L shown in FIG. 16.
Figure 19:
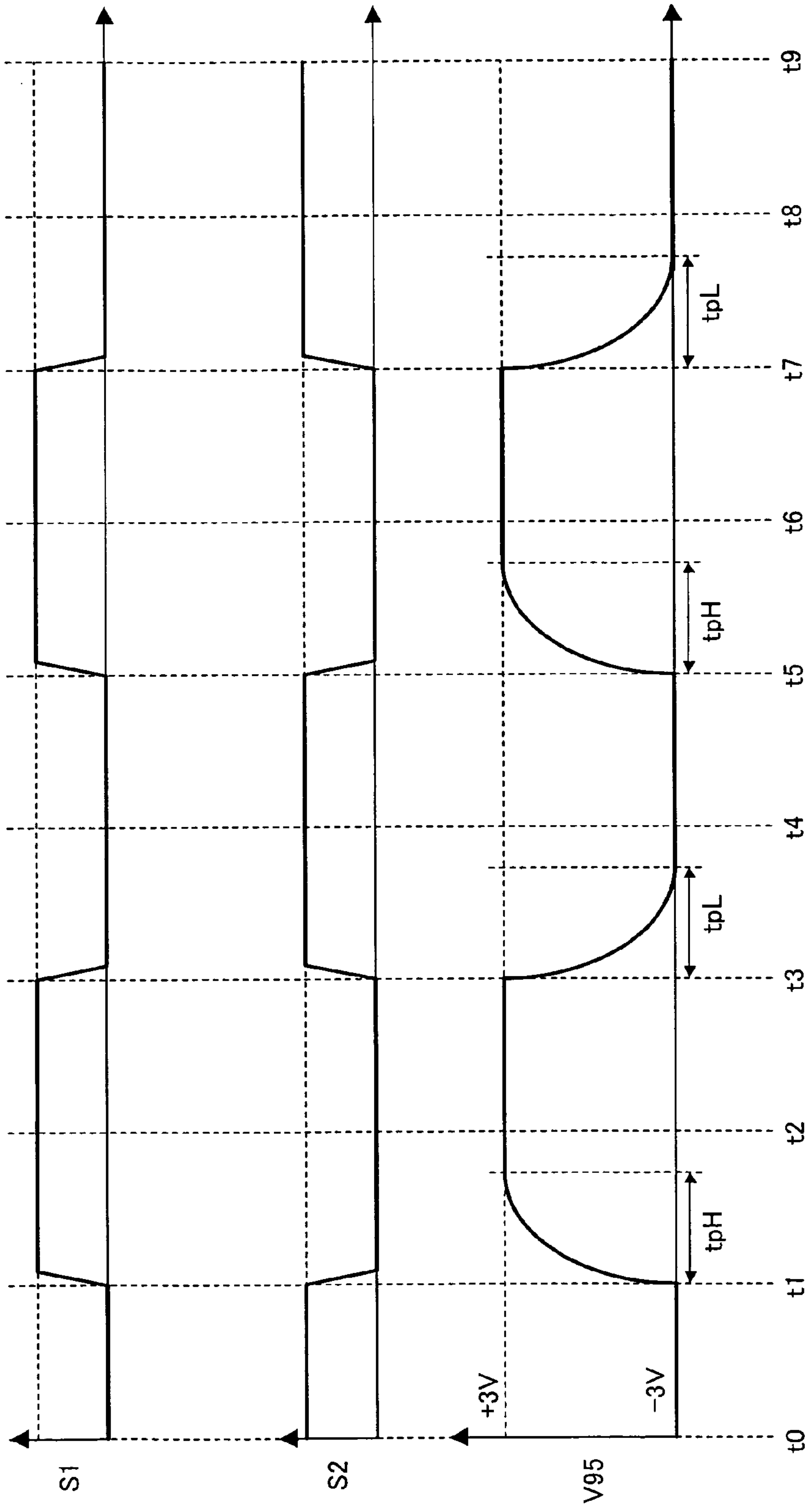
FIG. 19 PRIOR ART
FIG. 19 is a waveform diagram showing the control signals S1 and S2 and the voltage at an output terminal 95.

Next, an operation of the timing generation section 42 shown in FIG. 14 will be described with reference to FIG. 15. In the illustrated example, the voltage value of the H-level reference voltage VrH is "+2.5 V", and the voltage value of the L-level reference voltage VrL is "−2.5 V".

In the period t0-t1, the timing control section 41 keeps the control signal S1 at "L level" and the control signal S2 at "H level". Moreover, in the period t0-t1, the voltage V15 at the output terminal 15 is "−3 V". Since the control signal S1 is at "L-level", the switch 402 outputs the L-level reference voltage VrL (−2.5 V) to the comparator 403. Moreover, the voltage V15 at the output terminal 15 is "−3 V". Since the voltage value of the voltage V15 at the output terminal 15 (−3 V) is lower than that of the L-level reference voltage VrL (−2.5 V), the comparator 403 outputs the determination signal S403 indicating "H level". The control signal S1 indicates "L level" while the determination signal S403 from the comparator 403 indicates "H level", whereby the AND circuit 404H outputs the control signal S3 indicating "L level", and the AND circuit 404L outputs the control signal S4 indicating "L level".

At time t1, the timing control section 41 brings the control signal S1 to "H level" and the control signal S2 to "L level". Since the control signal S1 indicates "H level", the switch 402 outputs the H-level reference voltage VrH (+2.5 V) to the comparator 403. Moreover, the voltage V15 at the output terminal 15 is "−3 V". Since the voltage value of the voltage V15 at the output terminal 15 (−3 V) is lower than the voltage value of the H-level reference voltage VrH (+2.5 V), the comparator 403 outputs the determination signal S403 indicating "H level". The control signal S1 indicates "H level" while the determination signal S403 from the comparator 403 indicates "H level", whereby the AND circuit 404H outputs the control signal S3 indicating "H level" and the AND circuit 404L outputs the control signal S4 indicating "L level".

The voltage V15 at the output terminal 15 is lower than "+2.5 V" until the charging time trH elapses from time t1. Therefore, the comparator 403 keeps outputting the determination signal S403 indicating "H level". The control signal S1 indicates "H level" while the determination signal S403 from the comparator 403 indicates "H level", whereby the AND circuit 404H outputs the control signal S3 indicating "H level" and the AND circuit 404L outputs the control signal S4 indicating "L level".

The voltage V15 at the output terminal 15 reaches "+2.5 V" when the charging time trH elapses from time t4. Thereafter, as the voltage value of the voltage V15 becomes higher than the voltage value of the H-level reference voltage VrH (+2.5 V), the comparator 403 outputs the determination signal S403 indicating "L level". The control signal S1 indicates "H level" while the determination signal S403 from the comparator 403 indicates "L level", whereby the AND circuit 404H outputs the control signal S3 indicating "L level" and the AND circuit 404L outputs the control signal S4 indicating "L level".

At time t3, the timing control section 41 brings the control signal S1 to "L level" and the control signal S2 to "H level". Since the control signal S1 indicates "L level", the switch 402 outputs the L-level reference voltage VrL (−2.5 V) to the comparator 403. Moreover, the voltage V15 at the output terminal 15 indicates a voltage value of "+3 V". Since the voltage value of the voltage V15 at the output terminal 15 (+3 V) is higher than the voltage value of the L-level reference voltage VrL (−2.5 V), the comparator 403 outputs the determination signal S403 indicating "L level". The control signal S1 indicates "L level" while the determination signal S403 from the comparator 403 indicates "L level", whereby the AND circuit 404H outputs the control signal S3 indicating "L level" and the AND circuit 404L outputs the control signal S4 indicating "H level".

The voltage V15 at the output terminal 15 is higher than "−2.5 V" until the discharging time trL elapses from time t3. Therefore, the comparator 403 keeps outputting the determination signal S403 indicating "L level". The control signal S1 indicates "L level" while the determination signal S403 from the comparator 403 indicates "L level", whereby the AND circuit 404H outputs the control signal S3 indicating "L level" and the AND circuit 404L outputs the control signal S4 indicating "H level".

The voltage V15 at the output terminal 15 reaches "−2.5 V" when the discharging time trL elapses from time t3. Thereafter as the voltage value of the voltage V15 becomes lower than the voltage value of the L-level reference voltage VrL (−2.5 V), the comparator 403 outputs the determination signal S403 indicating "H level". The control signal S1 indicates "L level" while the determination signal S403 from the comparator 403 indicates "H level", whereby the AND circuit 404H outputs the control signal S3 indicating "L level" and the AND circuit 404L outputs the control signal S4 indicating "L level".

Then, in the period t4-t9, an operation similar to that in the period t0-t4 is performed.

Effects

As described above, when the potential at the output terminal 15 (the potential at the panel load C(LC)) reaches a predetermined reference value, the driving power of the VCOMH operational amplifier 13H (or the VCOML operational amplifier 13L) returns back to the normal power. Thus, it is possible to further reduce the power consumption.

The VCOMH operational amplifier 23H shown in FIG. 7 and the VCOML operational amplifier 23L shown in FIG. 8 may be used instead of the VCOMH operational amplifier 13H and the VCOML operational amplifier 13L shown in FIG. 13. Moreover, the VCOMH operational amplifier 33H shown in FIG. 10 and the VCOML operational amplifier 33L shown in FIG. 11 may be used instead of the VCOMH operational amplifier 13H and the VCOML operational amplifier 13L shown in FIG. 13.

The ladder resistor 401 may be implemented by means of the ladder resistor 111H and the ladder resistor 111L shown in FIG. 2.

While the H-level reference voltage VrH and the L-level reference voltage VrL are generated by the ladder resistor 401 in the present embodiment, they may be generated by any other suitable method. Moreover, the voltage values of the H-level reference voltage VrH and the L-level reference voltage VrL may be determined arbitrarily.

In any of the embodiments above, the VCOMH and VCOML operational amplifiers may be class-A or class-AB operational amplifiers, or the like. With any operational amplifier, the advantageous effects of the present invention can be obtained as long as the driving power of the differential stage or the output stage is optimized by a control signal.

While the time segments T1 to T9 are shown to be equal in length in various waveform diagrams for the sake of simplicity, the present invention is not limited to this.

The driving voltage control device of the present invention is useful in applications such as a driving voltage control device for controlling driving voltages for driving loads such as liquid crystal display panels by an AC driving method.

What is claimed is:

1. A driving voltage control device, comprising:

a first differential amplifier circuit having a driving power which is operable to be increased, and for receiving a first input voltage and outputting a first output voltage;

a second differential amplifier circuit having a driving power which is operable to be increased, and for receiving a second input voltage and outputting a second output voltage;

a control section for selecting one of a first mode and a second mode; and an output section for supplying the first output voltage output from the first differential amplifier circuit to an output node when the first mode is selected by the control section and supplying the second output voltage output from the second differential amplifier circuit to the output node when the second mode is selected by the control section, wherein when the first mode is selected, the control section increases the driving power of the first differential amplifier circuit.

2. The driving voltage control device of claim 1, wherein a period of time for which the driving power of the first differential amplifier circuit is increased is shorter than a period of time for which the control section continuously selects the first mode.

3. The driving voltage control device of claim 1, wherein when the first mode is selected, the control section inaeases the driving power of the first differential amplifier circuit according to a voltage value of a voltage at the output node.

4. The driving voltage control device of claim 3, wherein when the first mode is selected, the control section incrcascs the driving power of the first differential amplifier circuit until the voltage at the output node reaches a first voltage value.

5. The driving voltage control device of claim 4, wherein the control seciion includes:

a mode selector section for selecting one of the first and second modes;

a comparator section for comparing the voltage at the output node with a first comparative voltage having the first voltage value; and a driving power adjustment section for increasing the driving power of the first differential amplifier circuit according to the mode selected by the mode selector section and a comparison result from the comparator section.

6. The driving voltage control device of claim 5, wherein a voltage value of the first output voltage is higher than that of the second output voltage; and the driving power adjustment section increases the driving power of the first differential amplifier circuit if the first mode is selected by the mode selector section and if it is determined by the comparator section that the voltage at the output node is lower than the first comparative voltage.

7. The driving voltage control device of claim 5, wherein:
a voltage value of the first output voltage is lower than that of the second output voltage; and
the driving power adjustment section increases the driving power of the first differential amplifier circuit if the first mode is selected by the mode selector section and if it is determined by the comparator section that the voltage at the output node is higher than the first comparative voltage.

8. The driving voltage control device of claim 1, wherein the control section increases a driving power of the first differential amplifier circuit when the first mode is selected, and increases a driving power of the second differential amplifier circuit when the second mode is selected.

9. The driving voltage control device of claim 8, wherein:
a period of time for which the driving power of the first differential amplifier circuit is increased is shorter than a period of time for which the control section continuously selects the first mode; and
a period of time for which the driving power of the second differential amplifier circuit is increased is shorter than a period of time for which the control section continuously selects the second mode.

10. The driving voltage control device of claim 8, wherein when the first mode is selected, the control section increases the driving power of the first differential amplifier circuit until a voltage value of a voltage at the output node reaches a first voltage value, and when the second mode is selected, the control section increases the driving power of the second differential amplifier circuit until the voltage value of the voltage at the output node reaches a second voltage value.

11. The driving voltage control device of claim 10, wherein the control section includes:
a mode selector section for selecting one of the first and second modes;
a voltage selector section for selecting one of a first comparative voltage having the first voltage value and a second comparative voltage having the second voltage value according to the mode selected by the mode selector section;
a comparator section for compm-ing the voltage at the output node with the voltage selected by the voltage selector section; and
a driving power adjustment section for increasing the driving power of the first or second differential amplifier circuit according to the mode selected by the mode selector section and a comparison result from the comparator section.

12. The driving voltage control device of claim 11, wherein:
a voltage value of the first output voltage is higher than that of the second output voltage;
the voltage selector section selects the first comparative voltage when the first mode is selected by the mode selector section, and selects the second comparative voltage when the second mode is selected by the mode selector section; and
the driving power adjustment section increases the driving power of the first differential amplifier circuit if the first mode is selected by the mode selector section and if it is determined by the comparator section that the voltage at the output node is lower than the voltage selected by the voltage selector section, and increases the driving power of the second differential amplifier circuit if the second mode is selected by the mode selector section and if it is determined by the comparator section that the voltage at the output node is higher than the voltage selected by the voltage selector section.

13. The driving voltage control device of claim 1, wherein:
the first differential amplifier circuit includes:
a first differential stage;
first and second output transistors connected in series with each other between a first reference node receiving a first reference voltage and a second reference node receiving a second reference voltage; and
a first adjustment transistor;
the first output transistor is connected between the first reference node and the second output transistor, and receives at a gate thereof an output of the first differential stage;
the second output transistor is connected between the first output transistor and the second reference node, and receives at a gate thereof a voltage applied to a first voltage supply node;
the first differential stage outputs a voltage having a voltage value according to a difference between a voltage at a first interconnection node and the first input voltage, the first interconnection node being present between the first output transistor and the second output transistor;
when the first mode is selected, the control section sets a connection state of the first adjustment transistor to a first connection state; and
in the first connection state, the first adjustment transistor is connected between the first reference node and the first interconnection node, and receives at a gate thereof the output of the first differential stage.

14. The driving voltage control device of claim 1, wherein:
the first differential amplifier circuit includes:
a first differential stage;
first and second output transistors connected in series with each other between a first reference node receiving a first reference voltage and a second reference node receiving a second reference voltage; and
a first adjustment transistor;
the first output transistor is connected between the first reference node and the second output transistor, and receives at a gate thereof an output of the first differential stage;
the second output transistor is connected between the first output transistor and the second reference node, and receives at a gate thereof a voltage applied to a first voltage supply node;
the first differential stage outputs a voltage having a voltage value according to a difference between a voltage at a first interconnection node and the first input voltage, the first interconnection node being present between the first output transistor and the second output transistor;
when the first mode is selected, the control section sets a connection state of the first adjustment transistor to a first connection state; and
in the first connection state, the first adjustment transistor is connected between the first interconnection node and the second reference node, and receives at a gate thereof the voltage applied to the first voltage supply node.

15. The driving voltage control device of claim 1, wherein:
the first differential amplifier circuit includes:
first and second input transistors connected in series with each other between a first reference node receiving a first reference voltage and a second reference node receiving a second reference voltage;

third and fourth input transistors connected in series with each other between the first reference node and the second reference node;

a fifth input transistor connected between a first interconnection node and the second reference node, and receives at a gate thereof a voltage applied to a first voltage supply node, the first interconnection node being present between the second input transistor and the fourth input transistor;

a first adjustment transistor; and a first output stage;

the first input transistor is connected between the first reference node and the second input transistor, and a gate of the first input transistor is connected to a drain of the first input transistor;

the second input transistor is connected between the first input transistor and the first interconnection node, and receives at a gate thereof an output of the first output stage;

the third input transistor is connected between the first reference node and the fourth input transistor, and a gate of the third input transistor is connected to the gate of the first input transistor;

the fourth input transistor is connected between the third input transistor and the first interconnection node, and receives at a gate thereof the first input voltage;

the first output stage outputs the first output voltage having a voltage value according to a voltage at a second interconnection node between the third input transistor and the fourth input transistor;

when the first mode is selected, the control section sets a connection state of the first adjustment transistor to a first connection state; and in the first connection state, the first adjustment transistor is connected between the first interconnection node and the second reference node, and receives at a gate thereof the voltage applied to the first voltage supply node.

16. The driving voltage control device of claim 13, wherein:

the first differential amplifier circuit further includes a second adjustment transistor;

when the first mode is selected. the control section sets the connection state of the first adjustment transistor tote first connection state and sets a connection state of the second adjustment transistor to a second connection state; and in the second connection state, the second adjustment transistor is connected between the first interconnection node and the second reference node, and receives at a gate thereof a voltage applied tote first voltage supply node.

17. The driving voltage control device of claim 13, wherein:

a voltage value of the first reference voltage is higher than that of the second reference voltage;

the second differential amplifier circuit includes:

a second differential stage;

third and fourth output transistors connected in series with each other between a third reference node receiving a third reference voltage and a fourth reference node receiving a fourth reference voltage; and a second adjustment transistor;

a voltage value of the third reference voltage is lower than that of the fourth reference voltage;

the third output transistor is connected between the third reference node and the fourth output transistor, and receives at a gate thereof an output of the second differential stage;

the fourth output transistor is connected between the third output transistor and the fourth reference node, and receives at a gate thereof a voltage applied to a second voltage supply node;

the second differential stage outputs a voltage having a voltage value according to a difference between a voltage at a second interconnection node and the second input voltage, the second interconnection node being present between the third output transistor and the fourth output transistor;

the control section sets the connection state of the first adjustment transistor to the first connection state when the first mode is selected, and sets a connection state of the second adjustment transistor to a second connection state when the second mode is selected; and in the second connection state, the second adjustment transistor is connected between the third reference node and the second interconnection node, and receives at a gate thereof the output of the second differential stage.

18. The driving voltage control device of claim 14, wherein:

a voltage value of the first reference voltage is higher than that of the second reference voltage;

the second differential amplifier circuit includes:

a second differential stage;

third and fourth output transistors connected in series with each other between a third reference node receiving a third reference voltage and a fourth reference node receiving a fourth reference voltage; and a second adjustment transistor;

a voltage value of the third reference voltage is lower than that of the fourth reference voltage;

the third output transistor is connected between the third reference node and the fourth output transistor, and receives at a gate thereof an output of the second differential stage;

the fourth output transistor is connected between the third output transistor and the fourth reference node, and receives at a gate thereof a voltage applied to a second voltage supply node;

the second differential stage outputs a voltage having a voltage value according to a difference between a voltage at a second interconnection node and the second input voltage, the second interconnection node being present between the third output transistor and the fourth output transistor;

the control section sets the con riection state of the first adjustment transistor to the first connection state when the first mode is selected, and sets a connection state of the second adjustment transistor to a second connection state when the second mode is selected; and in the second connection state, the second adjustment transistor is connected between the second interconnection node and the fourth reference node, and receives at a gate thereof a voltage applied to the second voltage supply node.

19. The driving voltage control device of claim 15, wherein:

a voltage value of the first reference voltage is higher than that of the second reference voltage;

the second differential amplifier circuit includes:

sixth and seventh input transistors connected in series with each other between a third reference node receiving a third reference voltage and a fourth reference node receiving a fourth reference voltage;

eighth and ninth input transistors connected in series with each other between the third reference node and the fourth reference node;

a tenth input transistor connected between a third interconnection node and the fourth reference node, and receives at a gate thereof a voltage applied to a second voltage supply node, the third interconnection node being present between the seventh input transistor and the ninth input transistor;

a second adjustment transistor; and a second output stage;

a voltage value of the third reference voltage is lower than that of the fourth reference voltage;

the sixth input transistor is connected between the third reference node and the seventh input transistor, and a gate of the sixth input transistor is connected to a drain of the sixth input transistor;

the seventh input transistor is connected between the sixth input transistor and the third interconnection node, and receives at a gate thereof an output of the second output stage;

the eighth input transistor is connected between the third reference node and the ninth input transistor, and a gate of the eighth input transistor is connected to the gate of the sixth input transistor;

the ninth input transistor is connected between the eighth input transistor and the third interconnection node, and receives at a gate thereof the second input voltage;

the second output stage outputs a voltage having a voltage value according to a voltage at a fourth interconnection node between the eight input transistor and the ninth input transislor;

the control section sets the connection state of the first adjustment transistor to the first connection state when the first mode is selected, and sets a connection stare of the second adjustment transistor to a second connection state when the second mode is selected; and in the second connection state, the second adjustmnent transistor is connected between the third interconnection node and the fourth reference node, and receives at a gate thereof a voltage applied to the second voltage supply node.

* * * * *